(12) United States Patent
Furuhashi et al.

(10) Patent No.: US 8,593,456 B2
(45) Date of Patent: Nov. 26, 2013

(54) IMAGE GENERATING APPARATUS, METHOD OF GENERATING IMAGE, PROGRAM, AND RECORDING MEDIUM

(75) Inventors: Masakazu Furuhashi, Tokyo (JP); Koji Machida, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1234 days.

(21) Appl. No.: 12/178,837

(22) Filed: Jul. 24, 2008

(65) Prior Publication Data
US 2009/0027386 A1    Jan. 29, 2009

(30) Foreign Application Priority Data

Jul. 25, 2007 (JP) ................................. 2007-193881

(51) Int. Cl.
*G06T 15/40* (2011.01)
(52) U.S. Cl.
USPC ............................ 345/421; 345/419; 345/422
(58) Field of Classification Search
USPC ......................................... 345/419, 421–422
See application file for complete search history.

(56) References Cited

U.S. PATENT DOCUMENTS

| 6,738,059 B1 * | 5/2004 | Yoshinaga et al. | 345/419 |
| 2001/0017629 A1 * | 8/2001 | Minagawa et al. | 345/619 |
| 2003/0025710 A1 * | 2/2003 | Fukushima et al. | 345/592 |

FOREIGN PATENT DOCUMENTS

JP    2007-026111 A    2/2007

OTHER PUBLICATIONS

Lake et al. "Stylized Rendering Techniques for Scalable Real-Time 3D Animation" NPAR 00' Proceedings of the 1st International Symposium on Non-photorealistic Animation Rendering, 2000.*
English language Abstract of JP 2007-026111 A.
U.S. Appl. No. 12/179,081 to Furuhashi, which was filed on Jul. 24, 2008.
U.S. Appl. No. 12/179,011 to Furuhashi et al., which was filed on Jul. 24, 2008.

* cited by examiner

*Primary Examiner* — Maurice L McDowell, Jr.
(74) *Attorney, Agent, or Firm* — Greenblum & Bernstein, P.L.C.

(57) ABSTRACT

The object is to generate an image in which an overlapped part of a tuned object and a non-tuned object having a contour line drawn therein is naturally represented. Only tuned objects among objects existing in a virtual three-dimensional space are perspective transformed, and image data and depth data of each tuned object is written into a process buffer 163a for each pixel. The contour of each tuned object is detected based on the depth data and normal line data acquired from the perspective transformation process, and contour line data is written into a process buffer 163c together with the depth data. When a non-tuned objects is perspective transformed, in a pixel in which a non-tuned objected is located on the front side of a tuned object, image data and depth data of the process buffer 163a are updated. The contour line data of the process buffer 163c is combined with the image data of the process buffer 163a, and the composed data is written into a frame buffer 112. However, the contour line data of pixels having different depth data is not written.

17 Claims, 16 Drawing Sheets

FIG. 4A

OBJECT MAIN BODY

R : IMAGE DATA
G : IMAGE DATA
B : IMAGE DATA
α : DEPTH DATA

OBJECT NORMAL LINE

R : x COMPONENT
G : y COMPONENT
B : z COMPONENT
α : LINE WIDTH DATA

CONTOUR LINE

R : CONTUR LINE DATA
G : CONTOUR LINE DATA
B : CONTOUR LINE DATA
α : DEPTH DATA

163c

163

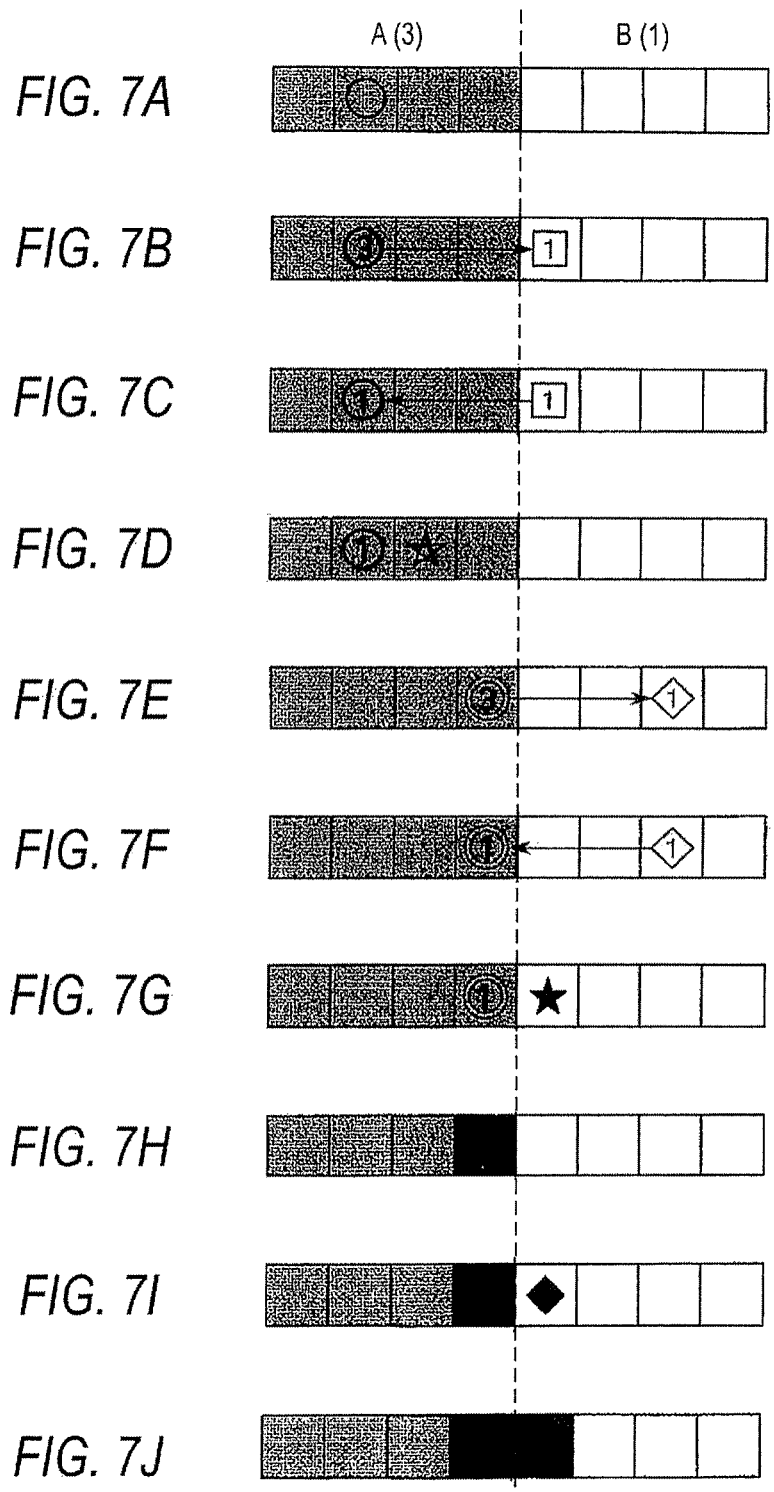

IMAGE GENERATING APPARATUS, METHOD OF GENERATING IMAGE, PROGRAM, AND RECORDING MEDIUM

CROSS REFERENCE TO RELATED APPLICATION

The present disclosure relates to subject matter contained in Japanese Patent Application No. 2007-193881, filed on Jul. 25, 2007, the disclosure of which is expressly incorporated herein by reference in its entirety.

BACKGROUND OF THE INVENTION

1. Field of the Invention

The present invention relates to an image generating apparatus that generates an image of a plurality of objects existing in a virtual three-dimensional space and the like, and more particularly, to drawing a contour line in a case where a target object in which a contour line is to be drawn and a non-target object in which a contour line is not to be drawn among the plurality of objects are overlapped with each other.

2. Description of the Related Art

In video games, owing to recent improvement of process capabilities of game devices, very realistic images can be drawn in three-dimensional computer graphics. However, in a game having a specific content, when the image is too realistic, the fun of the game decreases. Accordingly, in such a case, images of a cartoon style or an animation style are drawn in the three-dimensional computer graphics by using a technique called tuned rendering. A contour line is drawn in the contour of an object (hereinafter, referred to as a tuned object) for which a tuned rendering process is performed.

However, for example, in order to represent a case where an animation image and a photographed image are composed together, it is preferable that the game world is represented not by using only tuned objects and an object of terrain and the like are configured as objects (hereinafter, referred to as non-tuned objects) for which a tuned rendering process is not performed and a contour line is not drawn. As described above, when tuned objects and non-tuned objects are mixed together in a virtual three-dimensional space, it is natural that a case where a tuned object and a non-tuned object are overlapped with each other occurs.

However, in order to draw a contour line in the tuned object, first, the contour of the tuned object in an image projected on a virtual screen by a perspective transformation process needs to be detected. An operation for detecting the contour, for example, can be performed based on a contour detection image drawn in accordance with luminance depending on a distance from a viewing point of a virtual camera (for example, see JP-A-2007-26111 (paragraphs 0051 to 0093)). When the tuned objects and the non-tuned objects are mixed together, both of them are perspective transformed on the virtual screen. Accordingly, the tuned objects and the non-tuned objects are not differentiated for detection of the contours.

As described above, when the contours of objects are to be detected, in a part in which a plurality of objects are overlapped with one another, the boundary of the overlapped part is detected as the contours of the objects. The boundary of the part in which the tuned object and the non-tuned object are overlapped with each other is also the contour of the tuned object, and when a contour line is drawn along the contour of the tuned object, an image in which a contour line is drawn on the non-tuned object side on which the contour line is not supposed to be drawn is generated.

In such a case, when the tuned object is located on the front side (a side close to the viewing point), a contour line is drawn in the original shape of the tuned object, and a strong feeling of strangeness is caused. On the other hand, when the non-tuned object is located on the front side, there is a case where an unnatural image from which the tuned object is felt to be lifted up in a shape different from its original shape is generated. In addition, when the non-tuned object is located on the front side in a place in which tuned objects and non-tuned objects are complicatedly entangled, there is also a case where the contour lines are felt to be very disordered.

SUMMARY OF THE INVENTION

The object of the present invention is to provide an image generating apparatus and the like capable of generating an image in which an overlapped part of a tuned object and a non-tuned object is represented naturally in a case where a target object (the tuned object) in which a contour line is drawn and a non-target object (the non-tuned object) in which a contour line is not drawn are mixed in a two-dimensional image generated by a perspective transformation process.

In order to achieve the above-described object, according to a first aspect of the present invention, there is provided an image generating apparatus for generating an image in which a contour line is drawn in a target object among a plurality of objects existing in a virtual three-dimensional space and a contour line is not drawn in a non-target object other than the target object. The image generating apparatus includes: a virtual camera setting unit that sets a position of a viewing point of a virtual camera and a direction of a viewing axis in the virtual three-dimensional space to a predetermined position and a predetermined direction; a two-dimensional image drawing unit that draws a two-dimensional image acquired from performing a perspective transformation process for the plurality of objects in accordance with the virtual camera set by the virtual camera setting unit; a contour detecting unit that detects a contour of the target object included in the two-dimensional image drawn by the two-dimensional image drawing unit; an overlap determining unit that determines whether the target object is overlapped with the non-target object located in a position closer to the viewing point of the virtual camera than the target object in the two-dimensional image drawn by the two-dimensional drawing unit; a contour line drawing unit that draws a contour line in the contour detected by the contour detecting unit; and an image generating unit that generates an image composed of the two-dimensional image drawn by the two-dimensional image drawing unit and an image of the contour line drawn by the contour line drawing unit. When the target object is determined not to be overlapped with the non-target object by the overlap determining unit, the contour line drawing unit draws a contour line in the whole contour of the target object which is detected by the contour line detecting unit. On the other hand, when the target object is determined to be overlapped with the non-target object by the overlap determining unit, the contour line drawing unit draws a contour line in a part other than a part, in which the target object is determined to be overlapped with the non-target object, of the contour line of the target object which is detected by the contour line detecting unit.

In order to achieve the above-described object, according to a second aspect of the present invention, there is provided an image generating apparatus for generating an image in which a contour line is drawn in a target object among a plurality of objects existing in a virtual three-dimensional space and a contour line is not drawn in a non-target object other than the target object. The image generating apparatus includes: a virtual camera setting unit that sets a position of a viewing point of a virtual camera and a direction of a viewing axis in the virtual three-dimensional space to a predetermined position and a predetermined direction; a two-dimensional image drawing unit that draws a two-dimensional image acquired from performing a perspective transformation process for the plurality of objects in accordance with the virtual camera set by the virtual camera setting unit; a contour detecting unit that detects a contour of the target object included in the two-dimensional image drawn by the two-dimensional image drawing unit; an overlap determining unit that determines whether the target object is overlapped with the non-target object located in a position closer to the viewing point of the virtual camera than the target object in the two-dimensional image drawn by the two-dimensional image drawing unit; a contour line drawing unit that draws a contour line in the contour detected by the contour detecting unit; and an image generating unit that generates an image composed of the two-dimensional image drawn by the two-dimensional image drawing unit and an image of the contour line drawn by the contour line drawing unit. When the target object is determined to be overlapped with the non-target object by the overlap determining unit, the image generating unit is configured not to compose an image of a contour line of a part, which is determined to be overlapped, of the contour of the target object which is detected by the contour detecting unit.

In the above-described image generating apparatus according to the first or second aspect, there are a target object in which a contour line is drawn in a two-dimensional image generated from a perspective transformation process and a non-target object in which a contour line is not drawn in the two-dimensional image, in the virtual three dimensional space. When the target object is not overlapped with the non-target object located in a position closer to the viewing point of the virtual camera than the target object, in an image composed of an image of the contour line of the target object and an image generated by perspective transforming the plurality of objects, a contour line is drawn in the whole contour of the target object. In other words, since the contour line is drawn along the shape of the target object, a user can clearly recognize the whole image of the target object.

On the other hand, when the target object is overlapped with the non-target object in a position closer to the viewing point of the virtual camera than the target object, the boundary part is also a part in which the target object is overlapped with the non-target object located in a position closer to the viewing point of the virtual camera than the target object, and accordingly, a contour line is not drawn or an image of the contour line is not composed. Accordingly, an image in which an unnatural contour line is drawn to be felt that the target object is lifted up in a shape different from its original shape is not generated. In addition, even when the target object is overlapped with a non-target object having a complex shape, the contour line is not drawn along the complex shape. Accordingly, it can be prevented that the user acquires a disordered feeling from the image generated finally.

In addition, in the image generating apparatus according to the first or second aspect, it may be configured that a two-dimensional image acquired by perspective transforming a plurality of objects is drawn in a first buffer, an image of the contour line of the target object is drawn in a second buffer that is different from the first buffer, and the images drawn in the first and second buffers are composed together. As a buffer in which the image composed of the image of the plurality of objects and the image of the contour line is to be written, any one between the first and second buffers may be used, or a third buffer other than the first and second buffers may be used. It may be configured that an image is transferred from the buffer in which the image composed of the image of the plurality of objects and the image of the contour line is written to a frame buffer that is prepared separately. Alternatively, the buffer in which the image composed of the image of the plurality of objects and the image of the contour line may be used as the frame buffer.

In addition, in the image generating apparatus according to the first aspect, it may be configured that a two-dimensional image acquired by perspective transforming the plurality of objects is drawn in a buffer and the image of the contour line of the target object is drawn in the same buffer in an overlapping manner. In such a case, an image composed of the image of the plurality of objects and the image of the contour line is generated simultaneously with drawing the image of the contour line of the target object in the buffer, in which the image of the plurality of objects is drawn, in an overlapping manner. In other words, in that case, the contour line drawing unit and the image generating unit are the same unit.

In the image generating apparatus according to the first aspect, to draw a contour line in a part other than a part, which is determined to be overlapped with the non-target object, of the contour of the target object which is detected by the contour detecting unit includes to draw a contour line in the whole contour of the target object which is detected by the contour detecting unit and then remove the contour line positioned in a part other than a part, which is determined to be overlapped with the non-target object, of the contour of the target object.

In the above-described image generating apparatus according to the first aspect, the contour line drawing unit may be configured to draw the contour line in a part, in which the target object is continuously overlapped with the non-target object in a predetermined length or more, of a part determined not to be overlapped with the non-target object of the contour of the target object which is detected by the contour detecting unit in a case where the target object is determined to be overlapped with the non-target object by the overlap determining unit.

In addition, in the image generating apparatus according to the second aspect, the image generating unit may be configured not to compose an image of the contour line for a part, in which the target object is not continuously overlapped with the non-target object in a predetermined length or more, of a part determined not to be overlapped with the non-target object of the contour of the target object which is detected by the contour detecting unit in a case where the target object is determined to be overlapped with the non-target object by the overlap determining unit.

in such cases, in the contour of the target object overlapped with the non-target object located in a position close to the viewing point of the virtual camera, a part with which the non-target object is not overlapped, generally, the contour line is drawn or the image of the contour is composed. However, even in the part, except for a part that is not continuously overlapped with the non-target object for a predetermined length or more, the contour line is not drawn or the image is not composed. Accordingly, even when the shape of the non-target object in the perspective transformed two-dimensional image is complex and the target object is overlapped with a part of the complex shaped part of the non-target object near the contour part of the target object, in an image generated finally, short contour lines do appear intermittently, and thereby the screen is not viewed to be disordered. Particularly, when the contour line drawn in the target object is thick, the advantage is improved furthermore.

In the image generating apparatus according to the first or second aspect, the two-dimensional image drawing unit stores image data of the drawn two-dimensional image of the plurality of objects in the two-dimensional image storing unit together with depth data representing a distance from a short-distance clip surface which is determined based on setting of the virtual camera for objects located on a side close to the position of the viewing point of the virtual camera. In such a case, the overlap determining unit may determine whether the target object is overlapped with the non-target object located in a position closer to the viewing point of the virtual camera than the target object by comparing the depth data of the target object which is stored in the two-dimensional image storing unit with the depth data of the non-target object.

When a plurality of objects is perspective transformed, for example, the process is performed for the objects one after another. However, frequently different objects have different depths. Accordingly, by checking the depth data, it can be determined whether a target object and a non-target object are overlapped with each other.

In addition, in such a case, the contour detecting unit may detect the contour of the target object included in the two-dimensional image drawn by the two-dimensional image drawing unit based on the depth data of the target object stored in the two-dimensional image storing unit.

When a plurality of target objects exists in the virtual three-dimensional space, depth data changes markedly around the boundary, in which a plurality of objects is overlapped with each other, in the two-dimensional image generated by the perspective transformation process. Accordingly, the contours of the target objects can be detected based on the depth data. In addition, since the depth data is frequently used for other processes, and accordingly, data can be effectively used.

In the image generating apparatus according to the first or second aspect, the two-dimensional image drawing unit may store the image data of the drawn two-dimensional image of the plurality of objects in the two-dimensional image storing unit and store contour detection data other than the depth data representing the distance from the short-distance clip surface that is determined based on the setting of the virtual camera, which is used for extracting the contour of the target object, in a detection data storing unit. In such a case, the contour detecting unit may detect the contour of the target object included in the two-dimensional image drawn by the two-dimensional image drawing unit based on the contour detection data stored in the detection data storing unit.

Here, the contour detection data, for example, may be normal line data of the target object.

In a case where a plurality of target objects exists in the virtual three dimensional space, when the target objects are apart from one another, the contour lines of the target objects can be appropriately detected by using the depth data only. However, for example, when one target object is put into another target object, there is a case where the contour lines of the target objects cannot be appropriately detected by using the depth data only. On the contrary, by preparing contour detection data other than the dept data and detecting the contour lines of the target objects based on the contour detection data, the contour lines can be appropriately detected even in such a case. For example, normal line data changes markedly from a pixel of one target object to a pixel of another object, and accordingly, the normal line data is appropriate for detecting the contour lines of the target objects.

In addition, when the depth data is stored in the two-dimensional image storing unit together with the image data of the two-dimensional image of the drawn a plurality of target objects, the contour detecting unit may be configured to detect the contours of the target objects based on both the depth data and the contour detection data stored in a detection data storage unit. In addition, even when the depth data is stored in the two-dimensional image storing unit together with the image data of the two-dimensional image of the drawn plurality of target objects, the contour detecting unit may be configured to detect the contours of the target objects based on only the contour detection data stored in the detection data storing unit.

In the above-described image generating apparatus according to the first or second aspect, a plurality of target objects may be included in the plurality of objects. In such a case, the above-described image generating apparatus may further includes a contour line width setting unit that sets the line width of the contour line to be drawn in the contour detected by the contour detecting unit for each target object included in the two-dimensional image drawn by the two-dimensional image drawing unit. In addition, the contour line drawing unit may be configured to draw the contour line in the contour detected by the contour detecting unit with a line width set for each target object set by the contour line width setting unit.

In such a case, contour lines having line widths appropriate for the target objects can be drawn. For example, by setting the contour line of a target object that is displayed large in the perspective transformed two-dimensional image to be thick and the contour line of a target object that is displayed small in the two-dimensional image to be thin, the ratio of the contour line to the whole size of the target object can be set to be natural. In addition, by setting contour lines of specific targets object to be thick, the specific target objects among the plurality of target objects can be visually distinguished.

When the target object is determined to be overlapped with the non-target object by the overlap determining unit, the contour line width setting unit may set the line width of the contour line of a part, which is determined to be overlapped with the non-target object, of the contour of the target object which is detected by the contour detecting unit as zero. In such a case, the contour line drawing unit may be configured to draw a contour line in a part other than the part, which is determined to be overlapped with the non-target object, of the contour of the target object.

In addition, the contour line width setting unit may set the line width of the contour line of each target object in a dynamical manner or a static manner (that is, a line width set in advance is used). In a case where the line width of the contour line is set in the dynamical manner, when a reference line width of the contour line is set for each object in advance, a unit for storing the reference line width of the contour line of each target object and a unit for calculating the line width of the contour line of each target object in accordance with the reference line width become the contour line width setting unit. On the other hand, in a case where the line width of the contour line is set in the static manner, a unit for storing the line width of the contour line which has been set in advance for each object becomes the contour line width setting unit.

In the above-described image generating apparatus according to the first or second aspect, the two-dimensional image drawing unit may include a first image drawing section that draws a two-dimensional image acquired from perspective transforming the target object and a second image drawing section that draws a two-dimensional image acquired from perspective transforming the non-target object after the contour detecting unit detects the contour of the target object. In such a case, the contour detecting unit may be configured to detect the contour of the target object based on the two-dimensional image of the target object which is drawn by the first image drawing section.

In such a case, since the contour detecting unit detects the contour of the target object based on a two dimensional image generated by perspective transforming the target objects only, the boundary of a part in which a target object and a non-target object are overlapped with each other is not detected as the contour of the target object without identifying whether an object included in the perspective transformed two-dimensional image is a target object or a non-target object. In addition, when the non-target object is located in a position closer to the viewing point of the virtual camera than the contour of the target object which has been detected in advance, the part is also a part in which the target object is overlapped with the non-target object located in a position closer to the viewing point of the virtual camera than the target object. Accordingly, the contour line is not drawn or the image of the contour line is not composed, thereby an unnatural contour line is not drawn in the non-target object.

In the above-described image generating apparatus, the virtual three-dimensional space may be a game space of a video game. In other words, the image generating apparatus may be configured to generate images of a video game. Here, the target object may be a character that is operated in the game space of the video game, and the non-target object may be an object other than the character which exists in the game space.

In such a case, a player playing a video game can easily determine a character or an object other than a character based on whether a contour line is drawn in the contour of each object existing in the game space. In particular, when there is an object that cannot be determined to be a character or not, based on its whole shape only, the object can be easily determined to be a character or not, based on the inclusion of the contour line, and thereby an excellent advantage can be acquired.

In addition, when the virtual three-dimensional space is a game space of a video game, the contour line drawing unit may be configured not to draw the contour line of the target object in a case where the progress status of the game is a predetermined status.

Alternatively, the image generating unit may be configured not to combine the contour line drawn by the contour line drawing unit with the two-dimensional image drawn by the two-dimensional image drawing unit in a case where the progress status of the game is a predetermined status.

In such cases, a contour line is not drawn in the contour line of a target object, for which the contour line is originally supposed to be drawn, in a case where the progress status of the game is a predetermined status. Accordingly, for example, when a case where a target object is treated the same as a non-target object in accordance with the progress status of the game occurs, a player can easily determine an object that is treated as a target object as the original setting in the status.

In addition, a predetermined status in which the contour line is not drawn in the contour of the target object or the image of the contour line is not combined is, for example, a status in which an object originally configured to be operated in accordance with the operation of a player as a player character cannot be temporally operated in accordance with the operation of the player due to status abnormality occurring in the progress of the game. In addition, the predetermined status may include a status that a target object is in a scene (for example, a scene in which the target object explores in the darkness) in which high realistic sensation can be implemented in a case where the target object is not visually distinguished.

In order to achieve the above-described object, according to a third aspect of the present invention, there is provided a method of generating an image in which a contour line is drawn in a target object among a plurality of objects existing in a virtual three-dimensional space and a contour line is not drawn in a non-target object other than the target object and displaying the image in a display device. The method includes: setting a position of a viewing point of a virtual camera and a direction of a viewing axis in the virtual three-dimensional space to a predetermined position and a predetermined direction and storing information on setting of the virtual camera in the storage device; drawing a two-dimensional image acquired from perspective transforming the plurality objects based on the information on setting of the virtual camera which is stored in the storage device and writing the two-dimensional image in the storage device; detecting the contour of the target object included in the two-dimensional image drawn by the perspective transformation process and storing information on the detected contour in the storage device; determining whether the target object is overlapped with the non-target object located in a position closer to the viewing point of the virtual camera than the target object in the two-dimensional image that is drawn by the perspective transformation process and is written in the storage device; drawing an image of the contour line in the contour, information on which is written in the storage device by detection of the contour line detecting unit and writing the image of the contour line into the storage device; and generating an image composed of the two-dimensional image of the plurality of objects which is drawn by the perspective transformation process and written in the storage device and the image of the contour line which is drawn and written in the storage device and displaying the composed image in the display device. When the target object is determined not to be overlapped with the non-target object, a contour line is drawn in the whole detected contour of the target object in the drawing of an image of the contour line. On the other hand, when the target object is determined to be overlapped with the non-target object, a contour line is drawn in a part other than a part, in which the target object is determined to be overlapped with the non-target object, of the detected contour line of the target object in the drawing of an image of the contour line.

In order to achieve the above-described object, according to a fourth aspect of the present invention, there is provided a method of generating an image in which a contour line is drawn in a target object among a plurality of objects existing in a virtual three-dimensional space and a contour line is not drawn in a non-target object other than the target object and displaying the image in a display device. The method includes: setting a position of a viewing point of a virtual camera and a direction of a viewing axis in the virtual three-dimensional space to a predetermined position and a predetermined direction and storing information on setting of the virtual camera in the storage device; drawing a two-dimensional image acquired from perspective transforming the plurality objects based on the information on setting of the virtual camera which is stored in the storage device and writing the two-dimensional image in the storage device; detecting the contour of the target object included in the two-dimensional image drawn by the perspective transformation process and storing information on the detected contour in the storage device; determining whether the target object is overlapped with the non-target object located in a position closer to the viewing point of the virtual camera than the target object in the two-dimensional image that is drawn by the perspective transformation process and is written in the storage device; drawing an image of the contour line in the contour, information on which is written in the storage device by detection of the contour line detecting unit and writing the image of the contour line into the storage device; and generating an image composed of the two-dimensional image of the plurality of objects which is drawn by the perspective transformation process and written in the storage device and the image of the contour line which is drawn and written in the storage device and displaying the composed image in the display device. When the target object is determined to be overlapped with the non-target object, an image of a contour line of a part, which is determined to be overlapped, of the detected contour of the target object is not composed in the generating of an image.

In addition, in the above-described method of generating an image according to the third or fourth aspect, it may be configured that a buffer in which a two-dimensional image generated by perspective transforming a plurality of objects is written and a buffer in which the image of the contour line of a target object are individually prepared in the storage device and the images drawn in the buffers are combined together. Even when the image composed of the image of the plurality of objects and the image of the contour line is configured to be written into the frame buffer, the composition image may be written into another buffer (any one between the buffer in which the perspective transformed two-dimensional image is written and the buffer in which the image of the contour line is written may be used) other than the frame buffer and transferred to the frame buffer. Alternatively, in any one between the buffer in which perspective transformed two-dimensional image is written and the buffer in which the image of the contour line is written, the image composed of the perspective transformed two-dimensional image and the image of the contour line is configured to be written, and the buffer may be used as the frame buffer. This applies the same in the following program according to a fifth or sixth aspect of the invention.

In addition, in the above-described method of generating an image according to the third aspect, the buffer in which a two-dimensional image generated by perspective transforming a plurality of objects is written and the buffer in which the image of the contour line of a target object is written may be prepared in the storage device as a common buffer. In such a case, for example, in the buffer in which a two-dimensional image generated by perspective transforming a plurality of objects, the image of the contour line of the target object is written in an overlapping manner. By writing the image of the contour line of the target object, an image composed of the image of the plurality of objects and the image of the contour line is generated instantly. In other words, an operation for drawing an image of the contour line and writing the image into the storage device and an operation for generating an image composed of an image of the plurality of objects and an image of the contour line become the same with each other. In addition, the buffer used here can be used directly as the frame buffer. This applies the same in the following program according to a fifth aspect of the invention.

In order to achieve the above-described object, according to the fifth aspect of the present invention, there is provided a program that allows a computer apparatus to perform a process for generating an image in which a contour line is drawn in a target object among a plurality of objects existing in a virtual three-dimensional space and a contour line is not drawn in a non-target object other than the target object and displaying the image in a display device. The program allows the computer apparatus to perform: setting a position of a viewing point of a virtual camera and a direction of a viewing axis in the virtual three-dimensional space to a predetermined position and a predetermined direction and storing information on setting of the virtual camera in a storage device included in the computer apparatus; drawing a two-dimensional image acquired from perspective transforming the plurality objects based on the information on setting of the virtual camera which is stored in the storage device and writing the two-dimensional image in the storage device; detecting the contour of the target object included in the two-dimensional image drawn by the perspective transformation process and storing information on the detected contour in the storage device; determining whether the target object is overlapped with the non-target object located in a position closer to the viewing point of the virtual camera than the target object in the two-dimensional image that is drawn by the perspective transformation process and is written in the storage device; drawing an image of the contour line in the contour, information on which is written in the storage device by detection of the contour line detecting unit and writing the image of the contour line into the storage device included in the computer apparatus; and generating an image composed of the two-dimensional image of the plurality of objects which is drawn by the perspective transformation process and written in the storage device and the image of the contour line which is drawn and written in the storage device and displaying the composed image in the display device. When the target object is determined not to be overlapped with the non-target object, a contour line is drawn in the whole detected contour of the target object in the drawing of an image of the contour line, and when the target object is determined to be overlapped with the non-target object, a contour line is drawn in a part other than a part, in which the target object is determined to be overlapped with the non-target object, of the detected contour line of the target object in the drawing of an image of the contour line.

In order to achieve the above-described object, according to a sixth aspect of the present invention, there is provided a program that allows a computer apparatus to perform a process for generating an image in which a contour line is drawn in a target object among a plurality of objects existing in a virtual three-dimensional space and a contour line is not drawn in a non-target object other than the target object and displaying the image in a display device. The program allows the computer apparatus to perform: setting a position of a viewing point of a virtual camera and a direction of a viewing axis in the virtual three-dimensional space to a predetermined position and a predetermined direction and storing information on setting of the virtual camera in a storage device included in the computer apparatus; drawing a two-dimensional image acquired from perspective transforming the plurality objects based on the information on setting of the virtual camera which is stored in the storage device and writing the two-dimensional image in the storage device; detecting the contour of the target object included in the two-dimensional image drawn by the perspective transformation process and storing information on the detected contour in the storage device; determining whether the target object is overlapped with the non-target object located in a position closer to the viewing point of the virtual camera than the target object in the two-dimensional image that is drawn by the perspective transformation process and is written in the storage device; drawing an image of the contour line in the contour, information on which is written in the storage device by detection of the contour line detecting unit and writing the image of the contour line into the storage device included in the computer apparatus; and generating an image composed of the two-dimensional image of the plurality of objects which is drawn by the perspective transformation process and written in the storage device and the image of the contour line which is drawn and written in the storage device and displaying the composed image in the display device. When the target object is determined to be overlapped with the non-target object, an image of a contour line of a part, which is determined to be overlapped, of the detected contour of the target object is not composed in the generating of an image.

The program according to the fifth or sixth aspect may be recorded on a computer-readable recording medium. The computer-readable recording medium may be configured to be detachably attached to the computer apparatus and provided separately from the computer apparatus. In addition, the computer-readable recording medium may be disposed inside the computer apparatus and may be a recording medium such as a fixed disk device that is provided together with the computer apparatus. The program according to the fifth or sixth aspect may be delivered from a server apparatus existing on a network to the computer apparatus through the network by superposing a data signal into a carrier wave.

BRIEF DESCRIPTION OF THE DRAWINGS

FIG. 4 is a diagram showing the configuration of a process buffer used in the video game apparatus shown in FIG. 1.

FIG. 7 is a schematic diagram showing a sequence for determining the line width of the contour line of a tuned object.

DETAILED DESCRIPTION OF THE INVENTION

Hereinafter, an embodiment of the present invention will be described with reference to the accompanying drawings. Here, an example in which the present invention is applied to a process for forming an image in a video game will be described.

Figure 1:
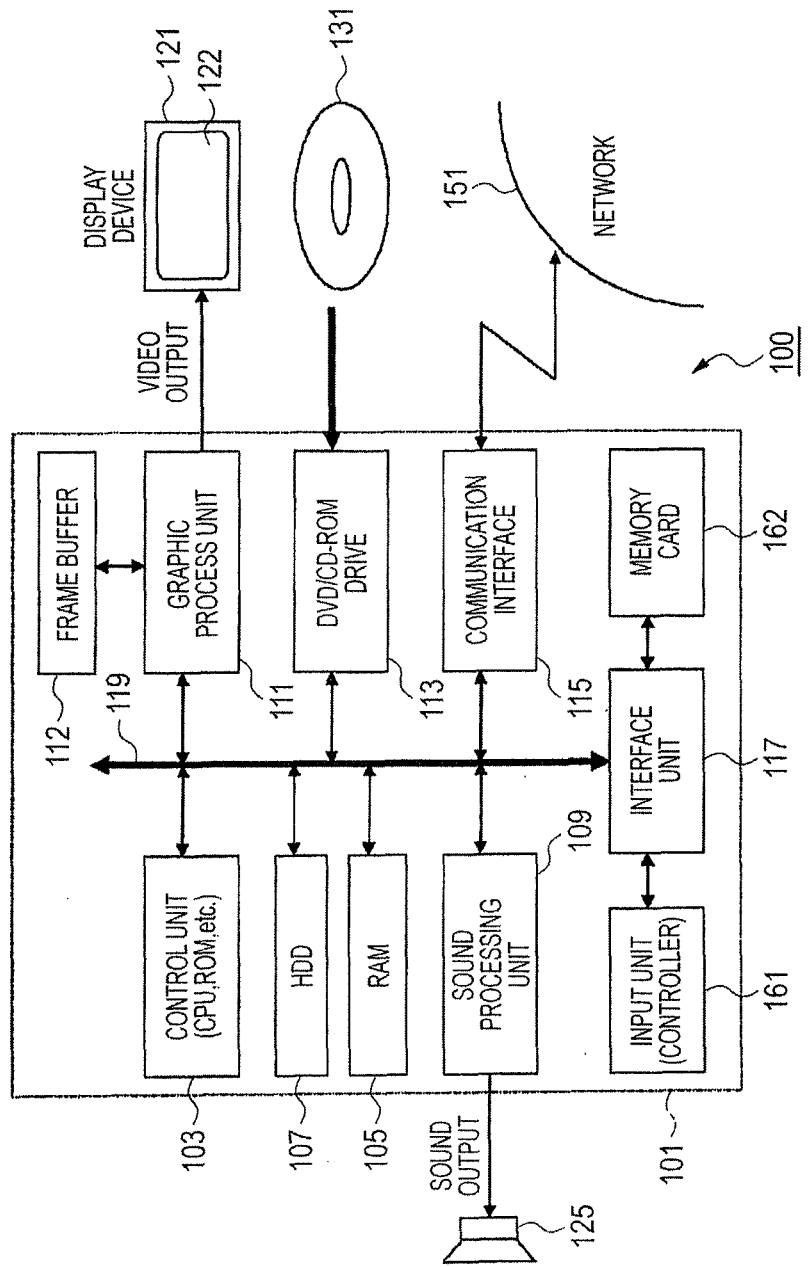
FIG. 1 is a block diagram showing the configuration of a video game apparatus according to an embodiment of the invention.

FIG. 1 is a block diagram showing the configuration of a video game apparatus according to an embodiment of the invention. As shown in the figure, the video game apparatus 100 is built with a device main body 101 used as a primary component. The device main body 101 includes a control unit 103 that is connected to an internal bus 119, a RAM (Random Access Memory) 105, a hard disk drive (HDD) 107, a sound processing unit 109, a graphic process unit 111, a DVD/CD-ROM drive 113, a communication interface 115, and an interface unit 117.

The sound processing unit 109 of the device main body 101 is connected to a sound output device 125, and the graphic process unit 111 is connected to a display device 121 having a display screen 122. Into the DVD/CD-ROM drive 113, a recording medium (in this embodiment, a DVD-ROM or a CD-ROM) 131 can be loaded. The communication interface 115 is connected to a network 151. To the interface unit 117, an input unit (a controller) 161 and a memory card 162 are connected.

The control unit 103 includes a CPU (Central Processing Unit), a ROM (Read Only Memory), or the like. The control unit controls the device main body 101 by executing a program stored in the HDD 107 or the recording medium 131. In addition, the control unit 103 includes an internal timer. The RAM 105 is a work area of the control unit 103. The HDD 107 is a storage area for storing a program or data. When a program executed by the control unit 103 directs to output sound, the sound processing unit 109 interprets the direction and outputs a sound signal to the sound output device 125.

The graphic process unit 111 expands image data into a frame buffer (a frame memory) 112 (in the figure, although the frame buffer is drawn outside the graphic process unit 111, it is provided inside a RAM included in a chip constituting the graphic process unit 111) in accordance with a drawing command output from the control unit 103 and outputs a video signal for displaying an image on a display screen 122 of the display device 121. A time period of one frame of an image included in a video signal output from the graphic process unit 111 is, for example, 1/60 second.

The graphic process unit 111 expands image data of a two-dimensional image acquired from performing a perspective transformation for a plurality of objects (tuned objects and non-tuned objects which will be described later) existing in a virtual three-dimensional space by using a virtual camera into one (an image data process buffer 163a) of process buffers 163 to be described later. The graphic process unit 111 draws a contour line for tuned objects among the objects included in the perspective transformed image data and expands the image data into the other process buffer (a contour line data process buffer 163c) of the process buffers 163.

The graphic process unit 111 has a process capability for processing data written into the process buffer 163, to be described later, in units of pixels for drawing a contour line. The configuration of the process buffers 163 will be described later in detail.

The DVD/CD-ROM drive 113 reads out a program and data from the recording medium 131. The communication interface 115 is connected to the network 151, and performs communication with other computers. The input unit 161 includes arrow keys and a plurality of operation buttons. By operating the arrow keys, a player character to be described later is moved, and by operating the operation buttons, predetermined processes are performed. The operation buttons are used for inputting predetermined directions.

The interface unit 117 outputs input data from the input unit 161 to the RAM 105, and the control unit 103 interprets the input data so as to perform a calculation process. The interface unit 117 stores data representing a progress status of a game, which is stored in the RAM 105, in the memory card 162, based on the direction from the control unit 103. In addition, the interface unit 117 reads out game data at a time when the game is stopped which is stored in the memory card 162 and transmits the game data to the RAM 105.

Programs and data used for performing a game by using the video game apparatus 100 are, at first, stored, for example, in the recording medium 131. The data stored in the recording medium 131 includes graphic data for configuring an object existing in the game space (a virtual three-dimensional space). The programs and data stored in the recording medium 131 are read out by the DVD/CD-ROM drive 113 in a game executing process and are then loaded into the RAM 105. The control unit 103 processes the programs and data loaded into the RAM 105, outputs a drawing command to the graphic process unit 111, and outputs a direction for outputting sound to the sound processing unit 109. Intermediate data during a process of the control unit 103 is stored in the RAM 105.

In a video game according to this embodiment, a plurality of three-dimensional objects exists in the virtual three-dimensional space that becomes a game space, and an image acquired from performing perspective transformation for the objects by using a virtual camera is displayed on the display screen 122 of the display device 121 as an image of the game. In the objects that exist in the virtual three-dimensional space, a player character that is operated in accordance with the operation of a player, a plurality of characters including non-player characters other than the player character, and objects such as fixed objects including a landscape, a building, a plant, and the like other than the characters are included. Each object is configured by one or more polygons.

Among these objects, there are characters for which parameters changing in accordance with the progress status of a game and statuses changing in accordance with the progress status of the game are set. There is a plurality of player characters, and for each of the player characters, both the parameter and the status are set. As the parameter, there is HP (when it becomes zero, behavior is incapacitated) representing a strength value. As the status, there are normal and abnormal statuses. In addition, as the abnormal status, there are, for example, an ordinary status abnormality in which the player character does not have ordinary offensive and defensive power and special status abnormality in which the player character is behaviorally incapacitated temporally.

Among these objects, each character is a tuned object in which a contour is drawn in the contour line. In addition, each object other than the characters is a non-tuned object in which a contour is not drawn in the contour line. In the video game according to this embodiment, for the convenience of description, each character is assumed to be treated as one object (generally in a video game, parts of a character can be treated as different objects).

In addition, here, for the simplification of a description, it is assumed that the only object that is a tuned-object is a character and all the characters are tuned objects. Accordingly, in descriptions below, an object referred to as a character and an object referred to as a tuned object represent a same object. However, in the descriptions, an object will be mainly referred to as a character in a case where the progress of a game is described as a subject, and an object will be mainly referred to as a tuned object in a case there generation of an image is described as a subject.

At first, a technique for performing a perspective transformation process for an object existing in the virtual three-dimensional space will be described. The techniques for performing the perspective transformation for a tuned object and a non-tuned object are the same except that a contour line is drawn after the perspective transformation for the tuned object. The perspective transformation is performed by projecting each object existing in the virtual three-dimensional space onto a virtual screen by using a virtual camera that is set toward a predetermined direction in a predetermined position of the virtual three-dimensional space.

Figure 2A:
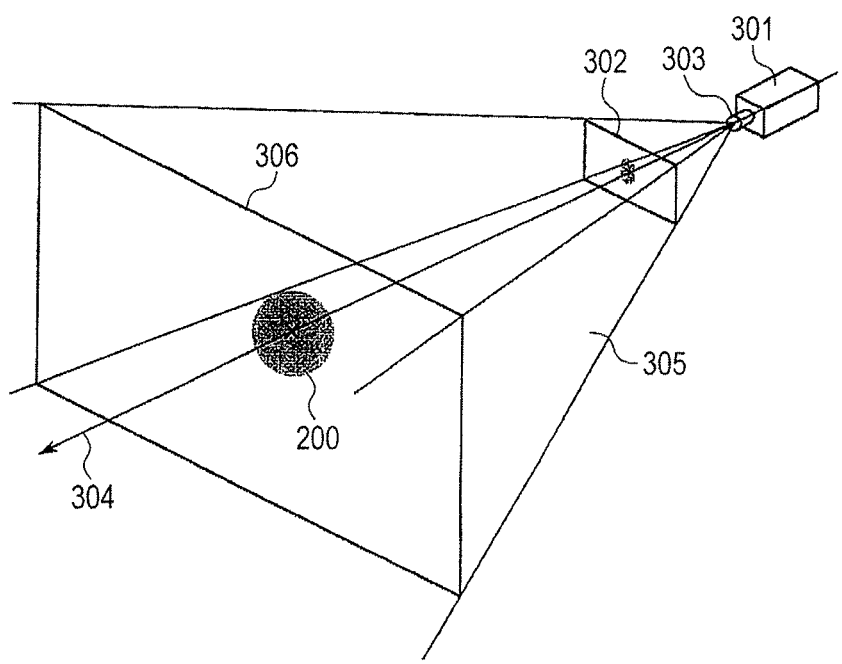
FIG. 2A is a diagram for describing a perspective transformation process.

FIG. 2A schematically represents a view of perspective transformation of a virtual three-dimensional space by using a virtual camera. In the virtual three-dimensional space, the virtual camera 301 is placed, and an image projected onto a virtual screen (a short-distance clip surface) 302 becomes an image displayed on the display screen 122 of the display device 121. The position of the virtual camera 301 becomes a viewing point 303, the direction of the virtual camera 301 becomes a viewing axis 304, an area formed by four lines that connects the viewing point 303 and four corners located in the vertices of the virtual screen 302 becomes a viewing field 305. In addition, a rear clip surface 306 is determined in a position apart from the viewing point 303 by a predetermined distance in the direction of the viewing axis 304. The range of clipping, that is, a range in which the image is generated by the perspective transformation in the virtual three-dimensional space becomes the range from the front clip surface 302 to the rear clip surface 306 within the range of the viewing field 305.

As described above, the coordinate system in the virtual three-dimensional space in which each object exists is represented by the world coordinate system. However, the world coordinates are transformed into coordinates of a viewing point coordinate system by the perspective transformation process and are transformed into coordinates of a screen coordinate system (a coordinate system on the virtual screen 302). When a projected image is formed on the virtual screen 302 by the perspective transformation process, a hidden surface removing process in which a surface hidden by other objects located on the front side is removed is needed to be performed. For performing the hidden surface removing process, depth data on the basis of the depth from the virtual screen 302 is used.

As a premise of the perspective transformation process, the position of the viewing point 303 of the virtual camera 301, the direction of the viewing axis 304, distances from the viewing point 303 to the front clip surface 302 and the rear clip surface 306 are needed to be determined (when these are determined, the area of the viewing system 305 is determined as a necessity). However, in the video game according to this embodiment, the distances from the viewing point 303 to the front and rear clip surfaces 302 and 306 are fixed. Accordingly, only the position of the viewing point 303 and the direction of the viewing axis 304 are needed to be determined before the perspective transformation process is performed.

The position of the viewing point 303 and the direction of the viewing axis 304 are set based on the progress status of the game. However, as a technique for setting them, various techniques that have been generally applied to a three-dimensional video game can be used. In addition, for performing a perspective transformation process for an object existing in the virtual three-dimensional space, the position of a light source matters. However, for simplification of the description, it is assumed that a light source having predetermined intensity of light is located in the position of the viewing point 303 and there is no shade of an object in the perspective transformation process.

In addition, for each object, the position of an approximate center of gravity is set as a reference point. When a position in the virtual three-dimensional space is determined for each object, the position of the reference point is used. However, in image data for which the perspective transformation process has been performed, a position (in particular, the depth) in the virtual three dimensional space is determined in units of pixels. In addition, each object has a predetermined shape in the virtual three-dimensional space, and normal line data of the surface of the shape is determined in units of pixels.

Figure 2B:
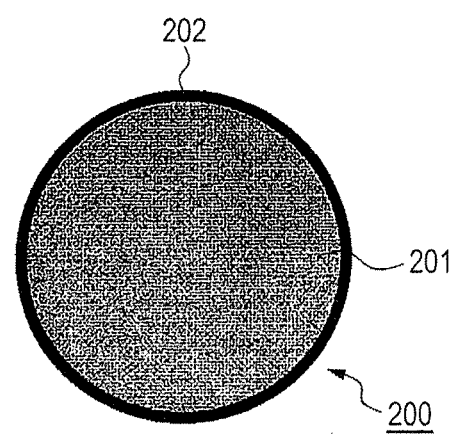
FIG. 2B is a diagram showing the configuration of a tuned object in an image generated by a perspective transformation process.

FIG. 2B is a diagram showing an example in which a tuned object is projected on the virtual screen 302 by the perspective transformation process and then a contour line is drawn in the projection. For the tuned object 200, a contour line 202 is drawn in the contour of the main body 201 of the tuned object. Although the colors of the main bodies 201 of the tuned objects may be different from each other, the contour lines 202 are drawn in colors of a color series different from that of the main bodies 201 of the tuned objects.

The thickness (line width) of the contour line 202, as described below, is calculated from a calculation process using coefficients that are determined in accordance with the distance of the tuned object 201 from the viewing point 303 and the progress status of the game, based on the reference width determined in advance. In other words, there are cases where line widths of contour lines 202 are different from each other even for a same tuned object. In addition, when a plurality of tuned objects exists in the clipping range, the line widths of contours may be different from one another for the tuned objects. In addition, outer frames of the main body 201 of the tuned object and the contour line 202 are the same, and the contour line 202 is drawn so as not to protrude from the area of the main body 201 of the tuned object. As the line width increases, the part of the contour line is widened to the inner side.

Figure 3A:
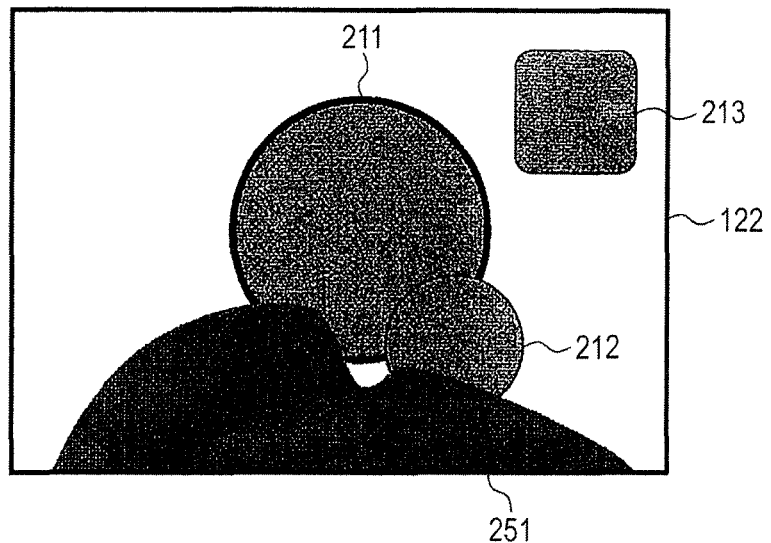
FIG. 3A is a diagram showing an example of the game screen of the video game.
Figure 3B:
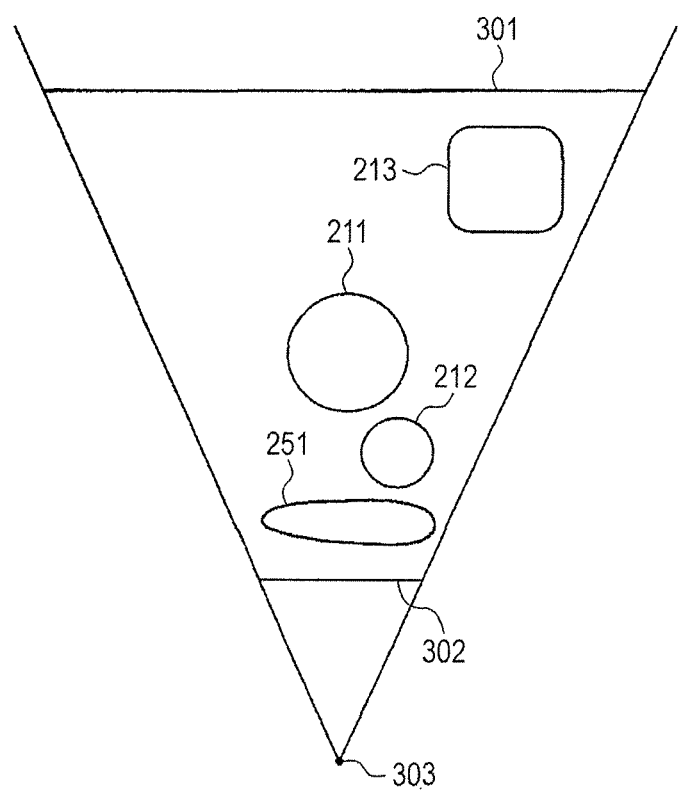
FIG. 3B is a diagram showing disposition of objects on the screen shown in FIG. 3A in the virtual space.

Next, in the video game according to this embodiment, an example of a game screen displayed on the display screen 122 of the display device 121 through the above-described perspective transformation process will be described. FIG. 3A is a diagram showing an example of the game screen of the video game. FIG. 3B is a diagram showing disposition of objects on the screen shown in FIG. 3A in the virtual space. In the game screen shown in FIG. 3A, for the simplification of description, the tuned objects 211 to 213 are represented in simple shapes such as a circle and a rectangle. However, actually, the shapes of the objects are the shapes of characters appearing in the game.

As shown in FIG. 3B, in the clipping range (the range of a trapezoid in the figure) of the virtual three-dimensional space, in order from a side closest to the virtual screen (the short-distance clip surface) 302, that is, in a descending order of the magnitude of a depth, a non-tuned object 251, a tuned object 212, a tuned object 211, a tuned object 213 are placed.

Although the order depends on the position relationship of the objects, in most of the cases, when the objects are aligned in order from a side closest to the position of the viewing point 303 of the virtual camera 301, the order is the same as in a case where the objects are aligned in a descending order of the magnitudes of depths. In addition, although original sizes of the tuned object 211 and the tuned object 213 in the virtual three-dimensional space are similar, the original size of the tuned object 212 in the virtual three-dimensional space is equal to or smaller than half the size of the tuned object 211 or the tuned object 213.

As shown in FIG. 3A, in the game screen generated by the perspective transformation process, the sizes of the tuned object 211 and the tuned object 213 become similar due to distances from the virtual screen 302, and the size of the tuned object 212 becomes larger than that of the tuned object 211 or the tuned object 213. In addition, a part of the tuned object 212 is overlapped with the front side of the tuned object 211, and a part of the non-tuned object 251 is overlapped with the front side of the tuned objects 211 and 212.

Here, although contours are drawn in all the contour lines of the tuned objects 211 to 213, as shown in FIG. 3A, in a part of the contour lines overlapped with the non-tuned object 251, a contour line is not drawn. In addition, the line widths of contour lines are individually set for the tuned objects 211 to 213, as shown in FIG. 3A, even for the tuned object 211 having a large line width, in a part of the tuned object 211 overlapped with the tuned object 212 having the contour line of a line width smaller than that of the tuned object 211 on the front side (the side closer to the virtual screen 302), a contour line having a same line width as that of the contour line of the tuned object 212 is drawn.

Next, in the video game according to this embodiment, the configuration of a process buffer 163 that is used for generating image data of an image displayed as the game screen will be described. FIGS. 4A to 4C are diagrams showing the configuration of the process buffer 163 that is used in the video game according to this embodiment. As shown in the figure, the process buffer 163 includes an image data process buffer 163a shown in FIG. 4A, a normal line data process buffer 163b shown in FIG. 4B, and a contour line data process buffer 163c shown in FIG. 4C.

The graphic process unit 111 needs to display an image as a display screen 122 of the display device 121 and draw new image data in a frame period, in accordance with image data drawn in the previous frame period. Accordingly, as the process buffer 163, a set of the image data process buffer 163a, the normal line data process buffer 163b, and the contour line data process buffer 163c is prepared. In addition, a frame buffer 112 that composes the images drawn in the process buffers 163 to be in a final display state for being displayed on the display screen 122 and draws an image is provided.

The image data process buffer 163a is a process buffer used for writing image data of a two-dimensional image acquired from performing a perspective transformation process for the tuned objects and the non-tuned objects, which exist in the virtual three-dimensional space, onto the virtual screen 302 for each pixel. In the image data process buffer 163a, image data of color components of R, G, and B for each pixel and depth data representing depth of each pixel of the written image data in the virtual three dimensional space are written. The depth data written here is used for detecting a contour line of a tuned object and determining whether objects are overlapped with each other.

The normal line data process buffer 163b is a process buffer in which normal line data representing the directions of normal lines of objects for each pixel of image data of the two-dimensional image acquired from perspective transforming the tuned objects and non-tuned objects existing in the virtual three-dimensional space on the virtual screen 302 is written. The normal line data is written for component x, component y, and component z of the world coordinate system. In the normal line data process buffer 163b, data for line width (line width data) of contour lines that is acquired by a calculation process to be described later is written. For acquiring the line width data, it may be configured that a reference width, to be described later, is written in advance, a new process buffer is provided, and a calculation process is performed in the new process buffer for acquiring a final line width.

The contour line data process buffer 163c is a process buffer in which image data of contour lines to be drawn in contour lines of tuned objects which are detected based on the image data of the two-dimensional image acquired from perspective transforming tuned objects existing in the virtual three dimensional space and the depth data representing the depths of the written contour line data for each pixel in the virtual three-dimensional space are written. Since the colors of the contour lines are different for the objects, the contour line data of color components of R, G, and B is written.

The depth data of the contour line is basically the same as depth data (depth data written in the image data process buffer 163a) of a corresponding tuned object. However, when the contour line of the tuned object is overlapped with a non-tuned object on the front side, the depth data to be written in the image data process buffer 163a is replaced with the depth data of the non-tuned object located on the front side. Accordingly, a part of the contour of the tuned object which is overlapped with a non-tuned object on the front side can be determined.

Figure 5:
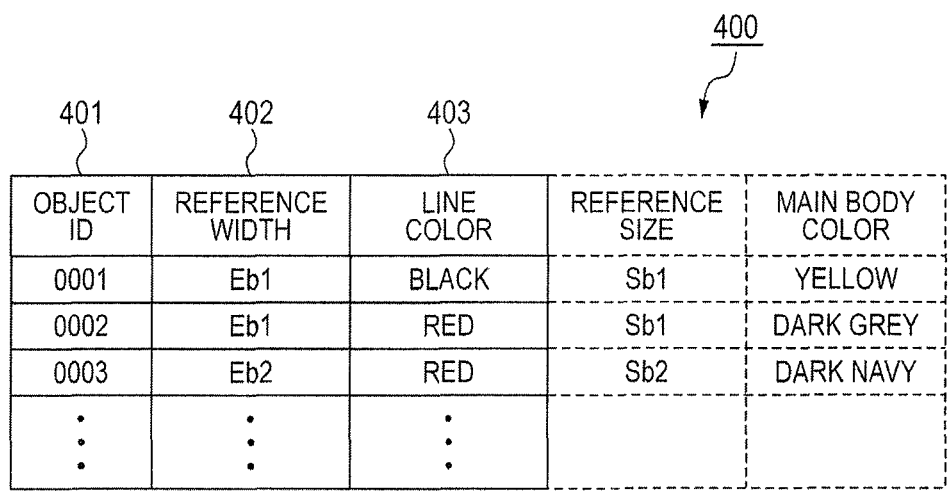
FIG. 5 is a diagram showing a contour line table that is referred to in a case where the contour line of each tuned object is drawn.

Next, setting of a line width of a contour line to be drawn in each tuned object and the color of the contour line will be described. FIG. 5 is a diagram showing a contour line table that is referred to in a case where the contour line of each tuned object is drawn. The contour line table is recorded in the recording medium 131 as fixed data used in a game. The contour line table is transferred to the RAM 105 in a process for starting a game and is referred to by the control unit 103.

As shown in the figure, in the contour line data table 400, an object ID 401, a reference width 402, and a line color 403 are registered in association with one another. The object ID 401 is identification information used for uniquely identifying each tuned object. In addition, to each non-tuned object, similar to the tuned object, an object ID for uniquely identifying the non-tuned object is assigned.

The reference width 402 is a width used as a reference for calculating a line width of a contour line to be drawn in each tuned object. The reference width 402 is determined in advance in accordance with the reference size of each tuned object projected onto the virtual screen 302, in a case where a distance from the viewing point 303 of the virtual camera 301 (or a distance from the virtual screen 302) is assumed to be a predetermined reference distance Db. For tuned objects having a same reference size, the reference width 402 is the same. In addition, as the reference size of the tuned object increases, the reference width 402 is configured to increase.

The line width W of the contour line of each tuned object is calculated by using an equation denoted by Numeric Expression 1 on the basis of a reference width 402 (Eb), a distance D from the position of the viewing point 303 of the virtual camera 301 to a reference point of each tuned object, and coefficient "a" determined in accordance with progress status of a game which are set in advance.

$$W = RNDUP(a \times Eb \times Db/D)$$ Numeric Expression 1

Here, the value of coefficient a is set to zero for a tuned object representing a character of which HP is zero or a character behaviorally incapacitated due to a special status abnormality, set to "0.7" for a tuned object representing a character having an ordinary status abnormality, and set to "1" for other tuned objects (including a character for which HP and the status are not set from the start). RNDUP is a function for rounding up the fractional part to the nearest integer.

Since the line width of the contour line of each tuned object is described as above, even for a same tuned object, the line width may be set to be smaller than the reference width 402 in a case where the distance D from the viewing point 303 of the virtual camera 301 is larger than the reference distance Db (that is, the size of the tuned object in an image generated by the perspective transformation is smaller than the reference size), or the line width may be set to be larger than the reference width 402 in a case where the distance D from the viewing point 303 of the virtual camera 301 is smaller than the reference distance Db (that is, the size of the tuned object in the image generated by the perspective transformation is larger than the reference size).

The line color 403 represents the color of the contour line drawn in each tuned object. Although it is represented as the color itself in the figure, actually the line color is stored as data of RGB components of corresponding colors. The line color 403 is set as a color of a color series different from the color of the main body of the corresponding tuned object. For example, when the color of the main body color is yellow, the line color 403 of the contour line of the tuned object 0001 is set to black. On the other hand, when the color of the main body is dark grey or dark navy, the line color of the contour line of the tuned object 0002 or 0003 is set to red.

Next, in the video game according to this embodiment, a sequence for generating image data of an image displayed on the display screen 122 of the display device 121 as a game screen for each frame period will be described. FIGS. 6A to 6D are schematic diagrams showing a sequence for generating image data of an image displayed as a game screen for each frame period. As a premise for performing the process of this sequence, it is assumed that the position of the viewing point 303 of the virtual camera 301 and the direction of the viewing axis 304 are determined and the clipping range is determined.

Figure 6A:
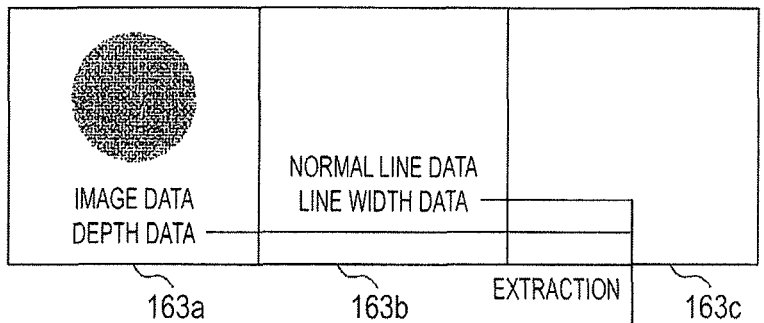
FIGS. 6A to 6D are diagrams showing a sequence for generating image data of an image displayed as a game screen for each frame period.

First, only tuned objects among objects included in the clipping range are perspective transformed. Accordingly, as shown in FIG. 6A, image data and depth data for RGB components of the tuned objects included in the clipping range are written into the image data process buffer 163a for each pixel, and normal line data of the tuned objects is written into the normal line data process buffer 163b for each pixel. In addition, the line width data representing the line width calculated for each tuned object by using Numeric Expression 1 is written into the normal line data process buffer 163b.

Next, the contours of tuned objects included in the clipping range are extracted with reference to the depth data written in the image data process buffer 163a, the normal line data and the line width data written in the normal line data process buffer 163b. As for the contour of the tuned object, a part having the depth data and/or the normal line data remarkably changing with respect to adjacent pixels is searched, and the part is detected as the contour of the tuned object. In the boundary of a part in which a plurality of tuned objects are overlapped with one another, the contours of the tuned objects are detected. The technique for detecting the contour of the tuned object is the same as that used in a general video game.

Figure 6B:
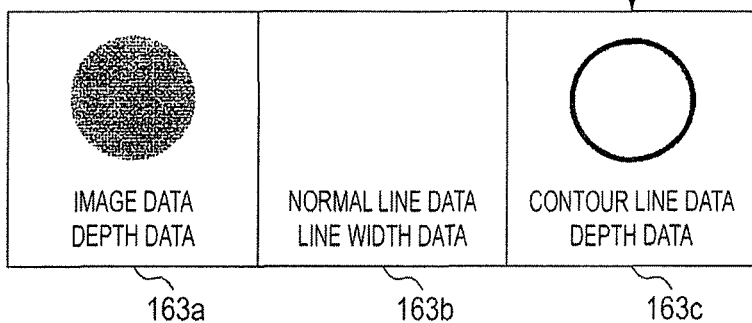

When the contours of the tuned objects included in the clipping range are detected, as shown in FIG. 6B, the contour line is drawn with the line width represented by the line width data stored in the normal line data process buffer 163b. In a part in which a plurality of tuned objects are overlapped with one another, the contour line is not necessarily drawn with the line width set for the object, and a detailed description thereof will be followed later. Here, the image data and the depth data of the contour lines for each RGB component are written into the contour line data process buffer 163c for each pixel. The depth data written here is the same as depth data pf a corresponding pixel which is written in the image data process buffer 163a.

Figure 6C:
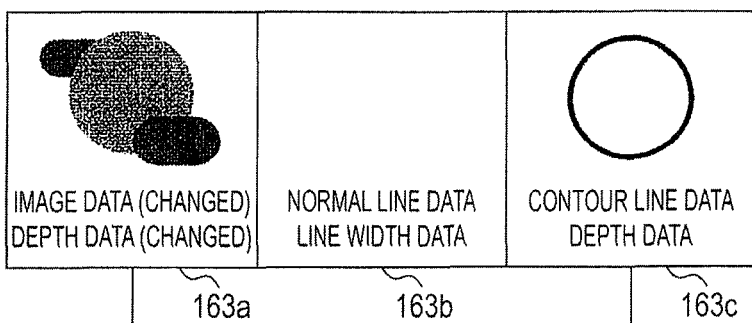

Next, among the objects included in the clipping range, non-tuned objects that have not perspective transformed in the stage shown in FIG. 6A are perspective transformed. Accordingly, as shown in FIG. 6C, image data and depth data of the non-tuned objects included in the clipping range for each RGB component are written into the image data process buffer 163a for each pixel. The normal line data of the non-tuned object for each pixel may be configured to be written into the normal line data process buffer 163b, or may be configured not to be written therein (the normal line data is not used for a process thereafter).

In addition, in each pixel of a part in which an already perspective transformed tuned object and a newly perspective transformed non-tuned object are overlapped with each other, when the depth of the non-tuned object is larger than that of the tuned object, both the image data and the depth data are not updated. On the other hand, when the depth of the non-tuned object is smaller than that of the tuned object, both the image data and the depth data are updated with those of the non-tuned object and are written into the image data process buffer 163a.

Figure 6D:
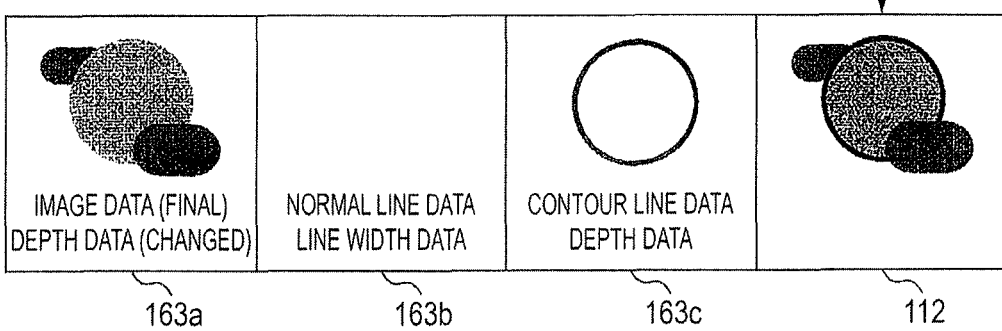

Finally, as shown in FIG. 6D, the contour line data written in the contour line data process buffer 163c is combined with the image data of the tuned objects and the non-tuned objects written in the image data process buffer 163a, and the composed data is drawn in the frame buffer 112. However, for pixels having different depth data, the contour line data written in the contour line data process buffer 163c is not combined. In addition, the finally composed image data may not be drawn in the frame buffer 112, and may be configured to be written into the normal line data process buffer 163b in which unnecessary data is stored.

Next, a sequence for drawing a contour line of a tuned object will be described. For each tuned object included in the clipping range, as described above, the line width of a contour line is calculated based on the reference width set in advance. In addition, the contour line of each tuned object in the perspective transformed image is detected based on the depth data written in the image data process buffer 163a and the normal line data and the line width data written in the normal line data process buffer 163b by performing a perspective transformation process for the tuned object. Here, a target pixel (a pixel included on the inner side from the part of the contour by the line width), for which whether the contour line is drawn in accordance with the line width of the contour line calculated for each tuned object is determined, is determined.

FIG. 7 is a schematic diagram showing a sequence for determining the line width of the contour line of a tuned object, and more particularly, a sequence for determining the line width of the contour line of an overlapped part in a case where a plurality of tuned objects is overlapped with one another. In this example, it is assumed that object A for which the line width of the contour line is set to "3" is overlapped with object B, for which the line width of the contour line is set to "1", located in a position close to the virtual screen 302.

For the tuned object A, the line width is set to "3", and accordingly, each pixel included inside the tuned object A becomes a target pixel one after another for which a process for determining whether to be a contour is performed. For each target pixel, pixels within a distance of three pixels from the each target pixel are set as determination pixels used for determining whether the pixels are set as contours. Each one of the determination pixels is set for one of four directions of up, down, left, and right from each target pixel. However, hereinafter, for the simplification of description, only relationship between the target pixel and a determination pixel located on the right side of the target pixel will be described. In addition, for the determination whether a pixel is set as a contour, the normal line data written in the normal line data process buffer 163b other than the depth data is actually used. However, for the simplification of description, only the depth data will be described.

When a pixel denoted by "○" shown in FIG. 7A is a target pixel, a pixel (represented by "□" in FIG. 7B) that is shifted by a line width (here, three pixels) set for the tuned object in which the target pixel is included becomes a determination pixel. Then, the depth data and the line width data of the target pixel and those of the determination pixel are compared with each other. Here, a process for determining that the depth data of the determination pixel is smaller than that of the target pixel may be performed (that is, a process described below is continuously performed) only when there is a big difference between the depth data of the target pixel and the depth data of the determination pixel to set a contour (that is, when the difference exceeds a predetermined threshold value).

When the depth data and the line width data of the target pixel and those of the determination pixel are compared with each other, the depth data and the line width data of the determination pixel are smaller than those of the target pixel. Accordingly, as shown in FIG. 7C, the line width of "1" of the contour line of the determination pixel is overwritten by the line width of the contour line of the target pixel. Thus, as shown in FIG. 7D, a pixel (denoted by "✧" in the figure) apart from the target pixel by one pixel is set as a new determination pixel, and the depth data of the target pixel and that of the determination pixel are compared with each other. At this moment, the depth data of the target pixel is not smaller than that of the determination pixel, and the target pixel is determined not to be a contour pixel in which the contour line is drawn.

Similarly, when each pixel denoted by "◉" shown in FIG. 7E is a determination pixel, a pixel denoted by "◇" shown in FIG. 7E is used as a determination pixel. Then, the depth data and the line width data of the target pixel and those of the determination pixel are compared with each other. In such a case, the depth data and the line width data of the determination are smaller than those of the target pixel. Accordingly, as shown in FIG. 7F, the line width data of the target pixel is overwritten with the line width data, that is, "1" of the determination pixel. Then, as shown in FIG. 7G, a pixel (denoted by "★" in the figure) apart from the target pixel by one pixel distance is used as a new determination pixel, and the depth data of the target pixel and that of the determination pixel are compared with each other. In such a case, the depth data of the target pixel is larger than that of the determination pixel, and thus the pixel denoted by "◉" is determined to be a contour pixel. Accordingly, as shown in FIG. 7H, the contour line is drawn in a line color set in the tuned object A, and the contour line data of the RGB components corresponding to the line color is written into the contour line data process buffer 163c.

For the tuned object B, a same process as that described above is performed. When a pixel denoted by "♦" shown in FIG. 7I is a target pixel, the line width of the tuned object B is set to "1", and accordingly, a pixel denoted by "◎", which is shifted by one pixel distance from the pixel denoted by "♦", shown in FIG. 7E is used as a determination pixel. Since the depth data of the pixel of the tuned object A is larger than that of the target pixel included in the tuned object B, as shown in FIG. 7J, the determination pixel is not changed, and the depth data of the target pixel and that of the determination pixel are compared with each other. Based on the result of the comparison, the target pixel is determined to be a contour line pixel, and the contour line data is written into the contour line data process buffer 163c.

Hereinafter, a process of the video game according to this embodiment will be described. The video game according to this embodiment progresses as a player sequentially clears events set in the game by operating a player character. As types of scenes of the game, there are an event scene and a battle scene. When a predetermined status occurs in the event scene, the scene of the game is switched to the battle scene. In addition, when the player character wins a battle performed in the battle scene, the scene of the game is switched to the original event scene.

In the event scene, only one player character appears, and the player progresses the game by moving the player character on an event map formed in the virtual three-dimensional space by operating the arrow keys of the input unit 161. On the event map, a plurality of non-player characters other than the one player character appears. When the player allows the player character to talk to a non-player character by performing a predetermined input using the input unit 161 in a state that the player character is positioned near the non-player character, useful information for the game can be acquired. For the non-player characters appearing in the event scene, a parameter such as HP or the status is not set.

In the battle scene, a plurality of player characters including the player character appearing in the event scene appears and one or more enemy characters (non-player characters) that battle against the plurality of player characters appear and fight a battle on a battle map formed in the virtual three-dimensional space. In the battle scene, the plurality of player characters becomes in an active state in a predetermined order. The player can enable the player character in the active state to perform an operation such as attack for the enemy character by performing a predetermined input by using the input unit 161. In addition, the enemy characters are sequentially in the active state and attack each player character.

As the player characters and the enemy characters attack each other, HP of the enemy characters or HP of the player characters decrease, and a character whose HP becomes zero is behaviorally incapacitated. When all the enemy characters are behaviorally incapacitated, the battle is over with victory of the player characters. On the other hand, when all the player characters are behaviorally incapacitated, the game is over. For the player characters and the enemy characters appearing in the battle scene, parameters such as HP and statuses are set. HP of the player character that also appears in the event scene does not change (that is, HP may be zero) even in a case where the scene of the game proceeds to the event scene. However, in the event scene, the fact that HP is zero is ignored.

Figure 8:
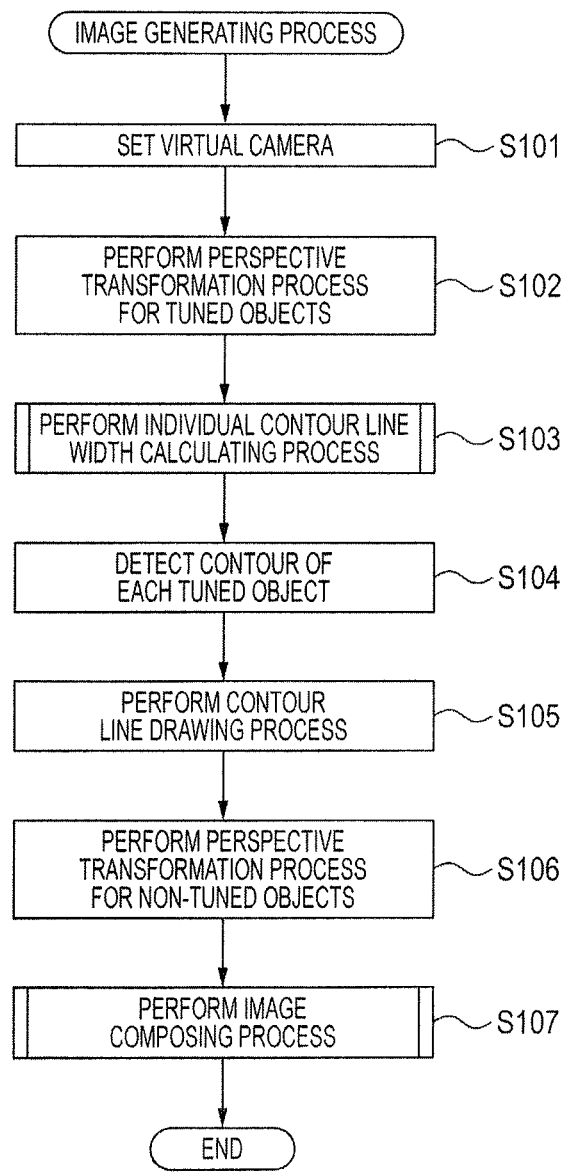
FIG. 8 is a flowchart showing an image generating process that is performed for each one frame period in a video game according to an embodiment of the present invention.

The appearance of progress of the game as described above appears to the player as a game screen that is generated based on the status of progress of the game for each one frame period. FIG. 8 is a flowchart showing an image generating process that is performed for each one frame period so as to generate image data of an image displayed on the display screen 122 of the display device 121 as a game screen in the video game according to this embodiment.

In descriptions below, all the steps are described as processes performed by the graphic process unit 111. However, a case where the processes are performed by the control unit 103 and the results of the processes are processed by the graphic process unit 111 is included. When a single processor system other than a multi-processor system having master-slave relationship as the video game apparatus 100 according to this embodiment is used, the process is performed in the sequence shown in flowcharts of FIG. 8 and FIGS. 9 to 11 in which processes of predetermined steps are described in detail. Accordingly, for easy understanding of the overall process flow, the processes are described as such.

In an image generating process, the graphic process unit 111 first sets the position of the viewing point 303 of the virtual camera 301 and the direction of the viewing axis 304 based on the progress status of the game. When the position of the viewing point 303 and the position of the viewing axis 304 are determined, the short-distance clip surface (the virtual screen) 302, the rear clip surface 306, and the range of the viewing field 305 are automatically determined. Accordingly, the clipping range that is a range, in which a perspective transformation process is performed in the virtual three-dimensional space, is determined (Step S101). Here, for setting of the virtual camera 301, a method that is used in a general video game is used.

Next, the graphic process unit 111 performs a perspective transformation process for the tuned objects among objects included in the clipping range. In addition, the graphic process unit writes RGB-component image data and depth data of each tuned object into the image data process buffer 163a for each pixel and writes the normal line data of each tuned object into the normal line data process buffer 163b. Here, for a pixel corresponding to a part in which a plurality of tuned objects are overlapped with one another, the image data, the depth data, and the normal line data of a tuned object having a smallest depth (that is, closest to the virtual screen 302) are written (Step S102). For progress of the game, at least the player character is included in the clipping range, and accordingly a case where a tuned object is not perspective transformed at all does not happen.

Next, the graphic process unit 111 performs an individual contour line width calculating process, which will be described in detail later, so as to calculate the line width of the contour line for each tuned object included in the clipping range. The calculated line width of the contour line for each object is stored in the normal line data process buffer 163b for each pixel of pixels inside the corresponding tuned object (Step S103). The calculated line width for each tuned object may not be stored for each pixel, and may be stored in the RAM 105 (or the RAM included in the graphic process unit 111) in association with the tuned object. In such a case the processes of Steps S102 and S103 may be performed in reverse order.

Next, the graphic process unit 111 detects the contour of each tuned object based on the depth data for each pixel of the tuned object which is written in the image data process buffer 163a and the normal line data for each pixel of the tuned object which is written in the normal line data process buffer 163b. For detecting the contour of each tuned object, a method that is used in a general video game is used. The information on the detected position of the contour for each tuned object is temporarily stored in the RAM 105 (or the RAM included in the graphic process unit 111) (Step S104).

Next, the graphic process unit 111 performs a contour line drawing process, which will be described in detail later so as to draw the contour line of each tuned object included in the clipping range in the color and line width set for each tuned object and write the RGB-component image data (contour line data) and the depth data of the contour line into the contour lined at a process buffer 163c for each pixel. The depth data written for each pixel is the same as that of the same pixel which is written in the image data process buffer 163a (Step S105).

Next, the graphic process unit 111 performs a perspective transformation process for non-tuned objects among the objects included in the clipping range which have not been perspective transformed in Step S102 and writes the RGB-component image data and the depth data of each non-tuned object for each pixel into the image data process buffer 163a. Here, for a pixel of a part in which the non-tuned object is overlapped with the tuned object that has already been perspective transformed, the RGB-component image data and the depth data of the non-tuned object are rewritten in a case where the depth of the non-tuned object is smaller than that of the tuned object (that is, the non-tuned object is located closer to the virtual screen 302 than the tuned object). On the other hand, in a case where the depth of the non-tuned object is larger than that of the tuned object (that is, the non-tuned object is located farther than the tuned object from the virtual screen 302), the image data and the depth data of the non-tuned object are not written (Step S106). There may be a case where a non-tuned object does not exist in the clipping range. In such a case, any non-tuned object is not perspective transformed, and the process proceeds to a process of the next step S107.

In addition, the graphic process unit 111 draws image data formed by composing the contour line data written in the contour line data process buffer 163c and the image data written in the image data process buffer 163a in the frame buffer by performing an image composing process to be described later in detail (Step S107). Then, the image generating process for this frame period is completed. The image data finally written into the frame buffer 112 by the image generating process is sequentially read out in the next frame period by the graphic process unit 111 and is output to the display device 121 as a video signal.

The image data formed by composing the image data written in the image data process buffer 163a and the image data written in the contour line data process buffer 163c may be configured to be temporarily stored in the normal line data process buffer 163b in which unnecessary data is stored and then be transmitted to the frame buffer 112.

Figure 9:
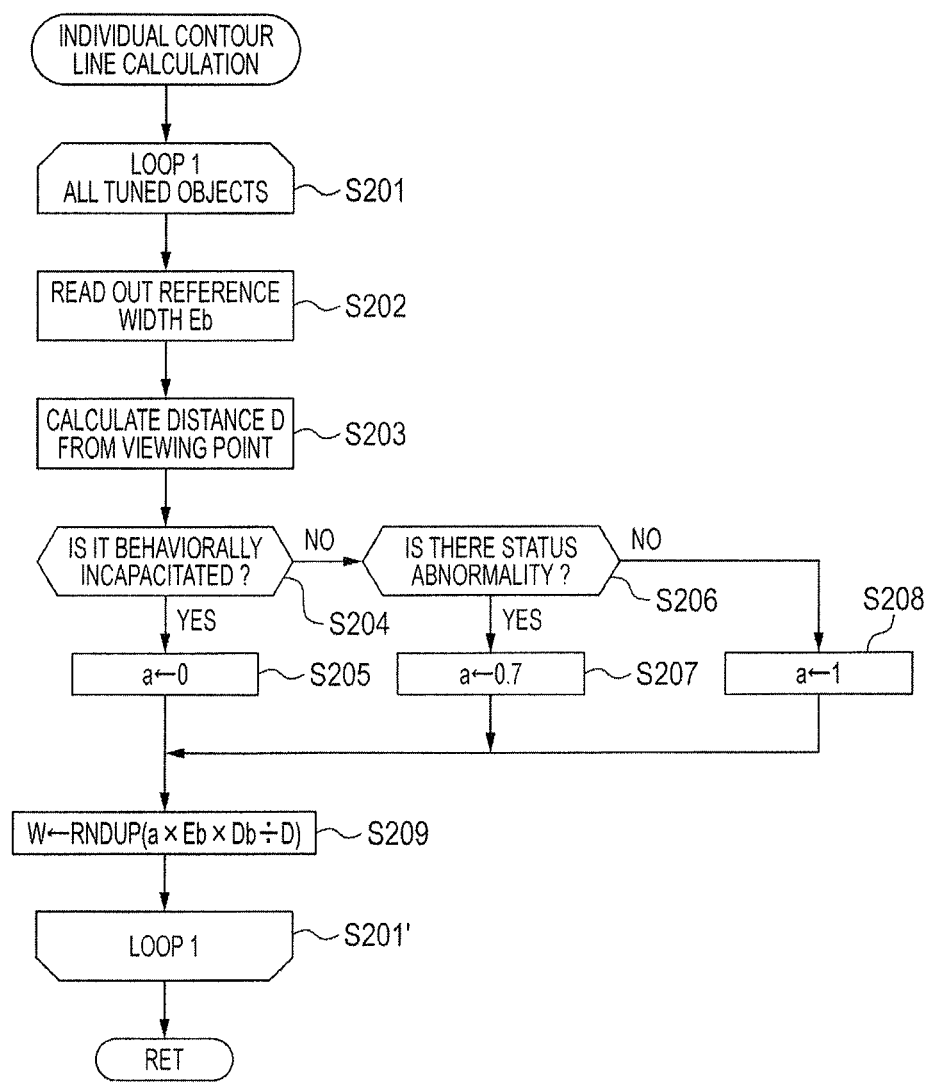
FIG. 9 is a flowchart showing a detailed individual contour line width calculating process shown in FIG. 8.

Next, the individual contour line width calculating process of Step S103 will be described in detail. FIG. 9 is a flowchart showing the individual contour line width calculating process of Step S103 in detail. In the individual contour line width calculating process, the graphic process unit 111 performs a loop process 1 for all the tuned objects included in the clipping range one after another (Steps S201 to S201').

In loop process 1, the graphic process unit 111 reads out a reference width (Eb) 402 registered in the contour line data table 400 for the tuned objects set as process targets (Step S202). Next, the graphic process unit 111 calculates a distance D between the tuned object set as the process target and the position of the viewing point 303 of the virtual camera 301 (Step S203).

Thereafter, the graphic process unit 111 determines whether the character is behaviorally incapacitated by determining whether the value of HP is zero or special status abnormality occurs with reference to the parameter and the status set for the character corresponding to the tuned object that becomes a process target (S204). When the character is behaviorally incapacitated, the graphic process unit 111 sets "0" to coefficient "a" that is determined based on the progress status of the game (Step S205). Then, the process proceeds to a process of Step S209.

When the character is not behaviorally incapacitated, the graphic process unit 111 determines whether an ordinary status abnormality has occurred by additionally referring to the status of the character (Step S206). When the ordinary status abnormality has occurred in the character, the graphic process unit 111 sets "0.7" to coefficient "a" that is determined based on the progress status of the game (Step S207). Then, the process proceeds to a process of Step S209.

When the ordinary status abnormality has not occurred in the character, the graphic process unit 111 sets "1" to coefficient "a" that is determined based on the progress status of the game. Since a parameter such as HP nor a status is not set for the non-player character existing in the event scene, both results of determination of Steps S204 and S206 become "NO", and "1" is set to coefficient "a" that is determined based on the progress status of the game for the corresponding tuned object. In addition, a case where the value of HP is zero for the player character in the event scene is ignored, and status abnormality does not occur in the event scene. Accordingly, "1" is set to coefficient "a" that is determined based on the progress status of the game for the corresponding tuned object (Step S208). Then, the process proceeds to a process of Step S209.

In Step S209, the graphic process unit 111 calculates the line width W of a contour line to be drawn for the tuned object by performing a calculation process using Numeric Expression 2. The calculated line width W is stored in the RAM 105 (or the RAM included in the graphic process unit 111) in association with object ID 401 of the tuned object.

$$W = RNDUP(a \times Eb \times Db/D)$$  Numeric Expression 2

Here, RNDUP is a function for rounding up the fractional part to the nearest integer.

Thereafter, the graphic process unit 111 determines whether loop process 1 has been performed for all the tuned objects included in the clipping range. When loop process 1 has been performed for all the tuned objects, the graphic process unit exits loop process 1. When exiting loop process 1, the individual contour line width calculating process is immediately completed, and the process is returned to the image generating process shown in FIG. 8.

Figure 10:
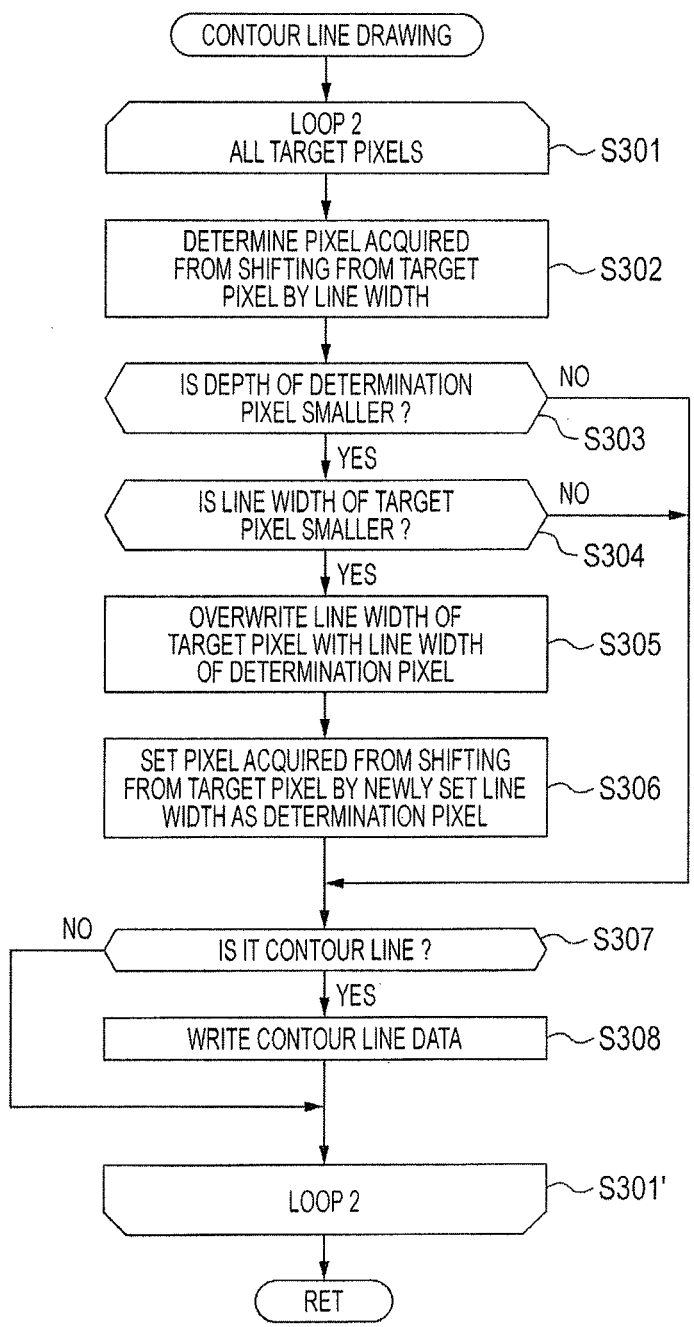
FIG. 10 is a flowchart showing a detailed contour line drawing process shown in FIG. 8.

Next, the contour line drawing process of Step S105 will be described in detail. FIG. 10 is a flowchart showing the contour line drawing process of Step S105 in detail. In the contour line drawing process, the graphic process unit 111 performs loop process 2 for pixels included in each perspective transformed tuned object one after another (Steps S301 to S301').

In loop process 2, the graphic process unit 111 extracts line width data of a target pixel to be processed from the normal line data process buffer 163b and determines a pixel in a position shifted by the line width represented by the line width data as a determination pixel (Step S302). The graphic process unit 111 extracts the depth data of the determination pixel that has been determined here and the depth data of the target pixel from the image data process buffer 163a and determines whether the depth data of the determination pixel is smaller than that of the target pixel to be processed (Step S303). When the depth data of the determination pixel is not smaller that that of the target pixel, the process immediately proceeds to a process of Step S307.

On the other hand, when the depth data of the determination pixel is smaller than that of the target pixel, the graphic process unit 111 extracts additional line width data of the determination pixel from the normal line data process buffer 163b and determines whether the line width data of the target pixel is smaller than that of the determination pixel (Step S304). When the line width data of the target pixel is not smaller than that of the determination pixel, the process immediately proceeds to the process of Step S307.

On the other hand, when the line width data of the target pixel is smaller than that of the determination pixel, the graphic process unit 111 overwrites the line width data of the target pixel with the line width data set in the determination pixel (Step S305). Then, the graphic process unit 111 determines a pixel located in a position shifted by the line width represented by the newly set line width data as a determination pixel (Step S306). Then, the process proceeds to the process of Step S307.

In Step S307, the graphic process unit 111 extracts the depth data of the determination pixel and the depth data of the target pixel to be processed from the image data process buffer 163b and compares the depth data of the determination pixel and that of the target pixel with each other. Then the graphic process unit determines whether the depth data of the target pixel is smaller than that of the determination pixel.

When the depth data of the target pixel is determined to be smaller than that of the determination pixel, the graphic process unit 111 reads out the line color 403 set in the tuned object to be processed, writes contour line data in the line color into the contour line data process buffer 163c for the target pixel, and writes the depth data (the same depth data as that written in the image data process buffer 163a) of the target pixel into the contour line data process buffer 163c (Step S308).

When the writing process of the contour line data is completed in Step S308 or the depth data of the target pixel that does not become the contour line of the tuned object to be processed for a pixel that becomes the target pixel to be processed in Step S307 is determined not to be smaller that that of the determination pixel, the graphic process unit 111 determines whether loop process 2 has been performed for all the pixels. When loop process 2 has been performed for all the pixels, the graphic process unit 111 exits loop process 2. When the graphic process unit exits loop process 2, the contour line drawing process is immediately completed, and the process is returned to the image generating process shown in FIG. 8.

Figure 11:
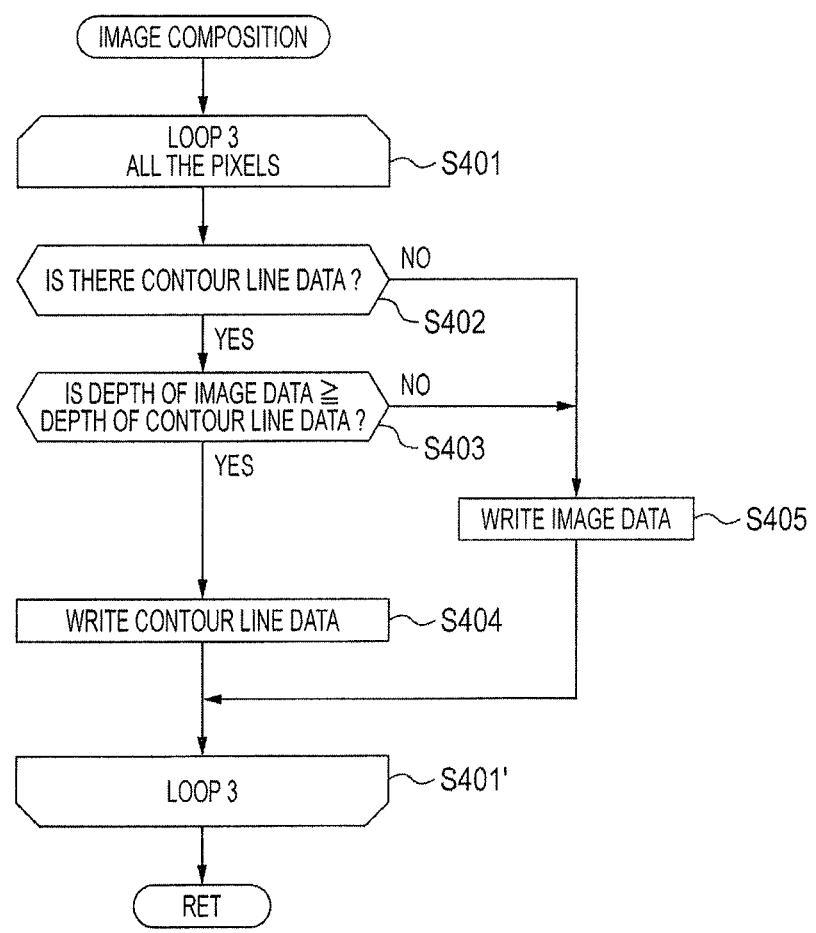
FIG. 11 is a flowchart showing a detailed image composing process shown in FIG. 8.

Next, the image composing process of Step S107 will be described in detail. FIG. 11 is a flowchart showing the image composing process of Step S107 in detail. In the image composing process, the graphic process unit 111 performs loop process 3 for all the pixels one after another (Steps S401 to S401').

In loop process 3, the graphic process unit 111 determines whether the contour line data of a pixel to be processed is written in the contour line data process buffer 163c (Step S402). When the contour line data is written, the graphic process unit 111 determines whether the depth data of the pixel which is written in the contour line data process buffer 163c is equal to or smaller than the depth data of the same pixel which is written in the image data process buffer 163a (Step S403).

When the depth data of the pixel which is written in the contour line data process buffer 163c is equal to or smaller than the depth data written in the image data process buffer 163a, the graphic process unit 111 writes the RGB component contour line data of the pixel which is written in the contour line data process buffer 163c into the frame buffer 112 as the image data of the same pixel (Step S404). Thereafter, the graphic process unit 111 determines whether loop process 3 has been performed for all the pixels. When loop process 3 has been performed for all the pixels, the graphic process unit exits loop process 3.

When contour line data of the pixel to be processed is not written, or the depth data written in the contour line data process buffer 163c and the depth data written in the image data process buffer 163a, for the pixel to be processed, are not the same, the graphic process unit 111 writes the RGB component image data written in the image data process buffer 163a as the image data of the same pixel into the frame buffer 112 (Step S405). Thereafter, the graphic process unit 111 determines whether loop process 3 has been performed for all the pixels. When loop process 3 has been performed for all the pixels, the graphic process unit exits loop process 3.

When the graphic process unit exits loop process 3, the image composing process is immediately completed, and the process is returned to the image generating process shown in FIG. 8. The image generating process is immediately completed by returning from the image composing process of Step S107.

Hereinafter, images of a tuned object and a non-tuned object which are displayed as game screens in the video game according to this embodiment will be described in detail by representing a detailed example thereof.

FIGS. 12A to 12D are diagrams showing detailed examples of relationship between the tuned object and the line width of the contour line which are displayed on the display screen. Here, relationship of distances of three tuned objects 211 to 213 from the viewing point 303 of the virtual camera 301 which have been described with reference to FIGS. 3A and 3B, sizes of the tuned objects 211 to 213 displayed on the display screen 122, and thicknesses of the contour lines drawn in the tuned objects 211 to 213 will be described. Here, a case where the line width of the contour line is changed in accordance with coefficient "a" that is determined based on the progress status of the game is not considered.

Figure 12A:
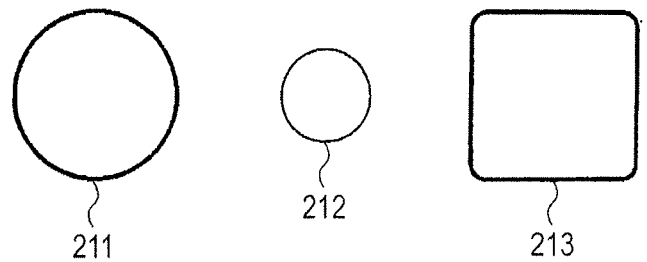
FIGS. 12A to 12D are diagrams showing detailed examples of relationship between the tuned object and the line width of the contour line which are displayed on the display screen.

FIG. 12A shows the status displayed on the display screen 122 in a case where all the tuned objects 211 to 213 are in positions apart from the position of the viewing point 303 by the reference distance. Since the original sizes of the tuned objects 211 and 213 in the virtual three-dimensional space are approximately the same, the sizes displayed on the display screen 122 through perspective transformation on the virtual screen 302 are approximately the same. On the contrary, since the original size of the tuned object 212 in the virtual three dimensional space is smaller than that of the tuned object 211 or 213, the size displayed on the display screen 122 is smaller than that of the tuned object 211 or 213.

In this case, the contour lines of the tuned objects 211 to 213 are drawn in reference widths 402 set for the tuned objects 211 to 213. However, the reference sizes of the tuned objects 211 and 213 are approximately the same, and accordingly, the reference widths 402 become the same. Accordingly, the line widths of the contour lines of images displayed on the display screen 122 become the same. On the contrary, since the reference size of the tuned object 212 is smaller than that of the tuned object 211 or 213, the reference width 402 of the tuned object 212 becomes smaller than that of the tuned object 211 or 213. Accordingly, the line width of the contour line of the image displayed on the display screen 122 becomes smaller than that of the tuned object 211 or 213.

Figure 12B:
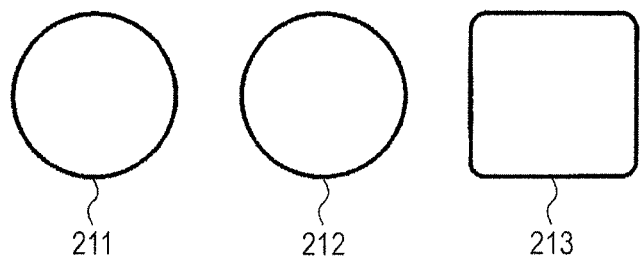

FIG. 12B shows a status displayed on the display screen 122 in a case where the tuned object 212 is located closer to the viewing point 303 than that shown in FIG. 12A. Here, as the tuned object 212 comes closer to the viewing point 303, the displayed size on the display screen 122 increases and becomes approximately the same as that of the tuned object 211 or 213. In such a case, the line width of the contour line of the tuned object 212 becomes larger than the reference width and becomes equivalent to that of the contour line of the tuned object 211 or 213.

Figure 12C:
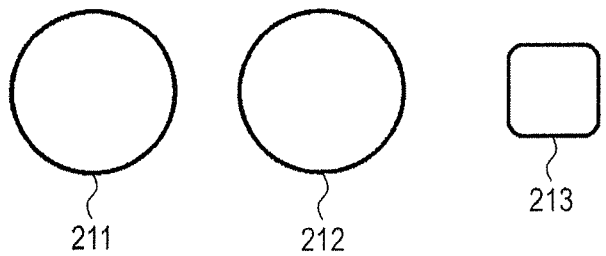

FIG. 12C shows a status displayed on the display screen 122 in a case where the tuned object 213 becomes apart farther from the viewing point 303 than that shown in FIG. 12B. Here, as the tuned object 213 becomes apart farther from the viewing point 303, the size of the tuned object 213 displayed on the display screen 122 decreases and becomes smaller than that of the tuned object 211 that has an approximately same size in the virtual three-dimensional space as the tuned object 213. In such a case, the line width of the contour line of the tuned object 213 becomes smaller than the reference width and becomes smaller than that of the tuned object 211. In addition, the reference width is smaller than the line width of the contour line of the tuned object 212 which is set to be small.

Figure 12D:
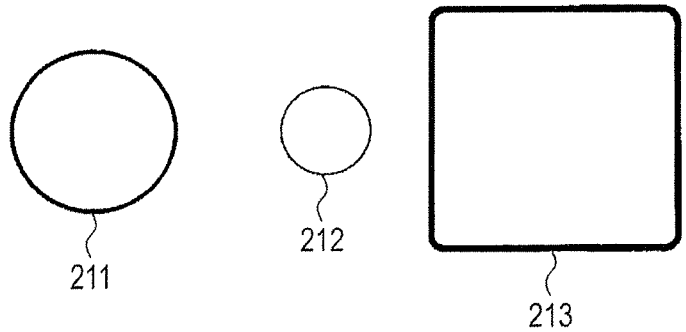

FIG. 12D shows a status displayed on the display screen 122 in a case where the tuned object 213 comes closer to the viewing point 303 than that shown in FIG. 12A. Here, as the tuned object 213 comes closer to the viewing point 303, the size of the tuned object 213 displayed on the display screen 122 increases and becomes larger than that of the tuned object 211 that has an approximately same size in the virtual three-dimensional space as the tuned object 213. In such a case, the line width of the contour line of the tuned object 213 becomes larger than the reference width and becomes larger than that of the tuned object 211.

Figure 13A:
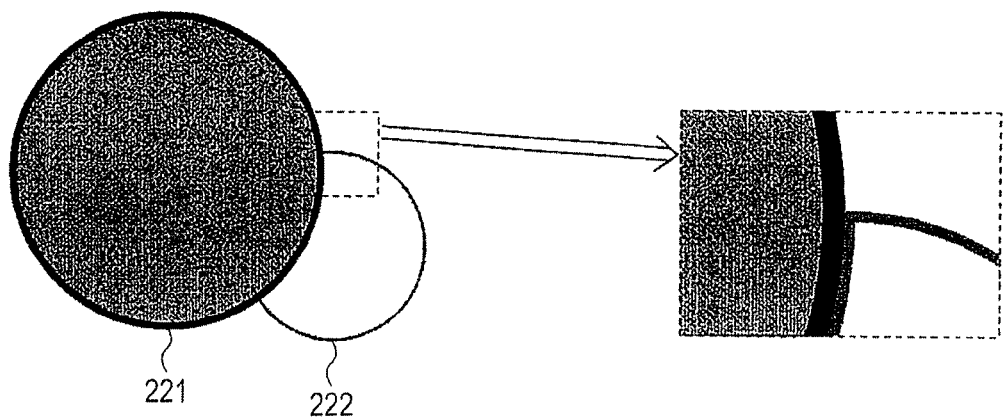
FIG. 13 is a diagram showing a detailed example for a case where a plurality of tuned objects are overlapped with each other.
Figure 13B:
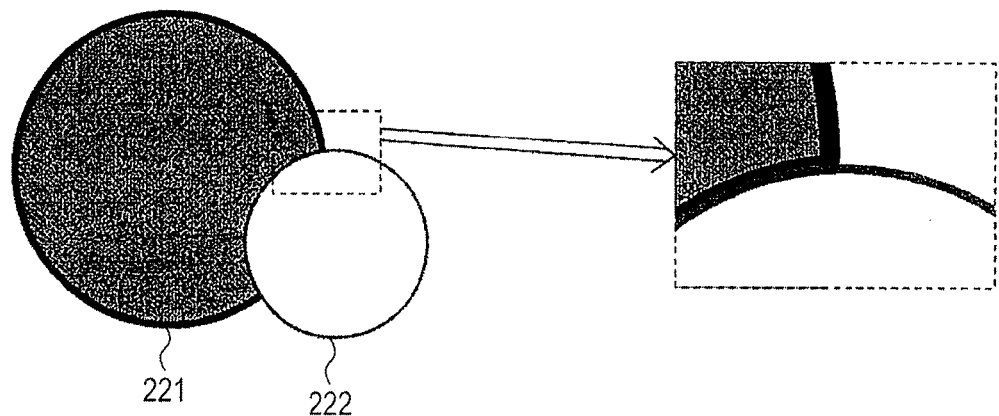

FIG. 13 is a diagram showing a detailed example for a case where a plurality of tuned objects is overlapped with each other. FIG. 13A shows a case where a tuned object 221 having a large line width of the contour line is located closer to the virtual screen 302 than a tuned object 222 having a small line width of the contour line. In addition, FIG. 13B shows a case where the tuned object 221 having the large line width of the contour line is located farther from the virtual screen 302 than the tuned object 222 having the small line width of the contour line.

In the example shown in FIG. 13A, since the tuned object 221 is located on a side close to the virtual screen 302, the whole contour line of the tuned object 221 is represented in its original line width. On the other hand, since the line width of the contour line of the tuned object 222 located on a side far from the virtual screen 302 is smaller than that of the tuned object 221, the whole contour line is represented in its original line width.

On the contrary, in the example shown in FIG. 13B, since the tuned object 222 is located on a side close to the virtual screen 302, the whole contour line of the tuned object 222 is represented in its original line width. On the other hand, the original line width of the contour line of the tuned object 221 located on a side far from the virtual screen 302 is larger than that of the tuned object 222. Thus, the contour line of the tuned object 221 is represented in its original line width in a part not overlapped with the tuned object 222. However, in a part of the tuned object 221 overlapped with the tuned object 222, the contour line is represented in the same line width as that of the tuned object 222 located on the side close to the virtual screen 302.

In addition, as shown in enlarged views shown in FIGS. 13A and 13B on the right side, contour lines are represented on the whole contours of the tuned objects 221 and 222 regardless whether the tuned objects 221 and 222 are overlapped with each other with any one between the tuned objects 221 and 222 disposed in a position closer to the virtual screen 302.

Figure 14:
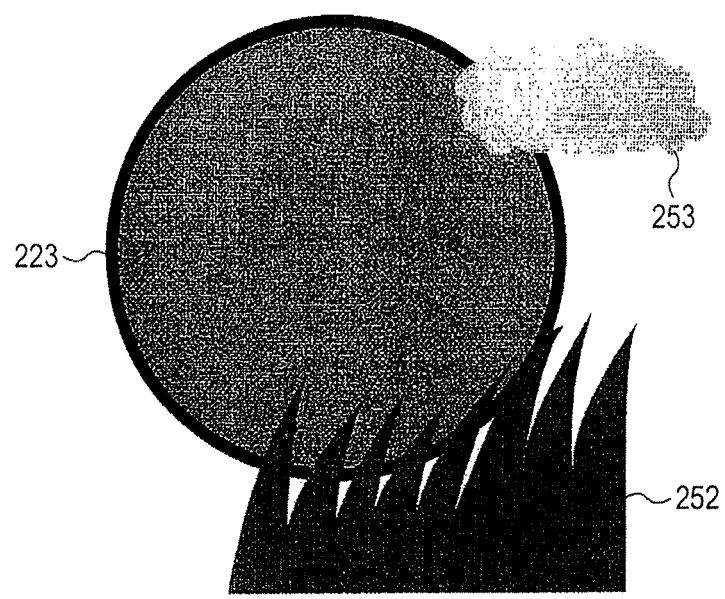
FIG. 14 is a diagram showing a detailed example for a case where a tuned object and a non-tuned object are overlapped with each other.

FIG. 14 is a diagram showing a detailed example for a case where a tuned object and a non-tuned object are overlapped with each other. As shown in the figure, in this example, a tuned object 223 is overlapped with apart of a non-tuned object 252 located in a position closer to the virtual screen 302. In addition, the tuned object 223 is overlapped with a part of a non-tuned object 253 located in a position farther from the virtual screen 203. Parts of the non-tuned object 252 overlapped with the tuned object 223 and parts of the non-tuned object 252 not overlapped with the tuned object 223 are complicatedly entangled with each other.

As shown in FIG. 14, the contour line of the tuned object 223 does not appear in a part overlapped with the non-tuned object 252 located in a position closer to the virtual screen 302. On the other hand, in a part of the tuned object 223 which is overlapped with the non-tuned object 253 located in a position farther from the virtual screen 302, the tuned object 223 side appears, and accordingly, the contour line of the tuned object 223 appears, too.

As described above, in the video game according to this embodiment, a tuned object of which contour line is drawn in an image displayed as a game screen and a non-tuned object of which contour line is not drawn in the image are included in objects existing in the virtual three dimensional space serving as a game space. Objects that become the tuned objects are characters including a player character and a non-player character, and objects that become the non-tuned objects are objects other than the characters.

As described above, by dividing tuned objects and non-tuned objects depending on whether an object is a character or a non-character, a player can easily identify a character from among objects displayed on the game screen based on inclusion of the contour line. In particular, when there is an object that cannot be determined to be a character or not, based on its whole shape only, the object can be easily determined to be a character or not, based on the inclusion of the contour line only, and thereby an excellent advantage can be acquired.

In addition, the line color of the contour line drawn in each tuned object is set to a color of a color series different from the color of the main body based on the color of the main body and is registered in the contour line data table 400 as a line color 403. In addition, the reference width for the line width of the contour line is set based on the reference size of each tuned object projected on the virtual screen 302 in a case where a predetermined reference distance Db is assumed to be a distance from the viewing point 303 of the virtual camera 301, and is registered in the contour line data table 400 in advance as the reference width 402. The reference width 402 is set based on the original size of each tuned object in the virtual three dimensional space.

In addition, when a two-dimensional image is generated by perspective transforming the tuned object, of which contour line is drawn, on the virtual screen 302 by using the virtual camera 301, the size of the tuned object in the generated image changes based on the distance from the virtual screen 302 to the tuned object. Although, to be precise, the size of the tuned object changes as described above, the size of the tuned object in the image generated by the perspective transformation process may be considered to approximately change based on the distance D from the viewing point 303 of the virtual camera 301 to the tuned object.

Here, the reference width 402 corresponding to the original size of each tuned object in the virtual three-dimensional space is not directly applied to the line width of the contour line drawn in each tuned object in the image of the tuned object generated by the perspective transformation process. On the other hand, the line width W calculated by performing an operation for the reference width (Eb) 402 based on the distance D from the viewing point 303 of the virtual camera 301 is applied to the line width of the contour line.

In addition, in the operation for calculating the line width W of the contour line of each tuned object, the reference width (Eb) 402 is divided by the distance D from the viewing point 303. Accordingly, when the size of the tuned object on the game screen increases as the tuned object comes closer to the viewing point 303 (the virtual screen 302), the line width of the contour line increases. On the other hand, when the size of the tuned object on the game screen decreases as the tuned object becomes farther from the viewing point 303 (the virtual screen 302), the line width of the contour line decreases. As described above, the contour line having an appropriate line width is drawn in correspondence with the size of each tuned object on the screen. In addition, a tuned object located in a position closer to the virtual screen 302 can be visually distinguished.

Accordingly, it can be prevented that the line width of the contour line of the tuned object in the two dimensional image generated by the perspective transformation process becomes too large or small for the size of the tuned object in the image. Thereby a natural contour line can be drawn for each tuned object. In addition, the color of the contour line or the degree of transparency is not changed in accordance with the size of the tuned object in the image generated by the perspective transformation process, and accordingly, a case where the contour line becomes indistinct as the tuned object is located farther from the position of the virtual screen 302 (or the viewing point 303) does not occur.

In addition, when a plurality of tuned objects is included in the clipping range, the contour lines having the line widths corresponding to the sizes of the two dimensional images generated by performing the perspective transformation process for each tuned object are drawn. Accordingly, the contour line is drawn in a line width appropriate for each tuned object based on the size displayed on the screen regardless of the original size in the virtual three-dimensional space. Therefore, when the line widths of the contour lines drawn in the tuned objects are compared to one another, a feeling of strangeness is not acquired even in a case where a plurality of tuned objects is visually compared with one another on the game screen by the player.

In addition, to be precisely, although the size of the tuned object in the image generated by the perspective transformation process is changed in accordance with the distance (that is, the depth) from the virtual screen 302, the line width W of the contour line is configured to be changed in accordance with the distance D from the viewing point 303 of the virtual camera 301. The distance from the viewing point 303 to each tuned object can be calculated in a relatively easy manner, compared to the depth of each tuned object, and accordingly, the line width of the contour line can be easily calculated. In addition, not by precisely calculating the line width of the contour line based on the depth, the line width of the contour line of each tuned object is calculated without incurring any practical problem.

In this embodiment, characters existing in the game space are determined as tuned objects, and a player character and an enemy character, for which a parameter such as HP having a value and the status having a state changing in accordance with the progress status of the game are set, are included in the characters. Here, the line width of the contour line of the tuned object corresponding to the player character or the enemy character appearing in the battle scene is changed depending on coefficient "a" that is determined based on the progress status of the game in addition to the distance D from the viewing point 303.

Here, the value of coefficient "a" is set to "0" in a case where the value of HP is zero or the corresponding character is behaviorally incapacitated due to occurrence of a special status abnormality, and is set to "0.7" in a case where an ordinary status abnormality occurs in the corresponding character. In other words, the contour line of a tuned object of which the corresponding character is behaviorally incapacitated is not drawn. In addition, the contour line of a tuned object of which the corresponding character has an ordinary status abnormality becomes thinner than that of a tuned object of which the corresponding character does not have an ordinary status abnormality.

Generally, on a game screen, a tuned object of which contour line is drawn is more visually distinguished than a non-tuned object of which contour line is not drawn, and a tuned object having a thick contour line is more visually distinguished than a tuned object having a thin contour line from among tuned objects displayed in the same size. As described above, in an operation for calculating the line width W of the contour line of each tuned object, a specific character can be set to be less visually distinguished than other characters in progress of a game by using coefficient "a" having a value changing in accordance with the progress status of the game as a multiplier, and thereby the player can play the game in an easy manner.

In addition, the contour line of a tuned object for which the value of coefficient "a" is set to zero due to behavioral incapacitation of the corresponding character is not drawn on the game screen. Since such a character does not perform any behavior, the player can determine the tuned object in which the contour line is drawn to be able to perform a behavior at the current time point in an easy manner.

When a plurality of tuned objects exists in the clipping range, the tuned objects may be overlapped with one another in an image generated by a perspective transformation process. Here, in a case where the line width of the contour line of a tuned object located in a position farther from the virtual screen 302 is thick and the line width of the contour line of a tuned object located in a position closer to the virtual screen 302 is thin, when the contour lines are drawn in the tuned objects with the originally set line widths, an image in which the tuned object located on the rear side is felt to be lifted up to the front side in a shape different from its original shape may be generated.

On the contrary, in the video game according to this embodiment, when the line width of the contour line of the tuned object located in a position far from the virtual screen 302 is thick and the line width of the contour line of the tuned object located in a position close to virtual screen 302 is thin, in the contour of the overlapped part, the contour line of the tuned object located in the position far from the virtual screen 302 is drawn in the same line width as that of the tuned object located in the position close to the virtual screen 302. Accordingly, an image in which the originally thick contour line is drawn in a shape different from its original shape for the whole tuned object, which is originally located far from the virtual screen 302, to be felt to be lifted up to the front side is not generated, and a natural image is generated.

In addition, although the line width of the contour line may be changed in accordance with the contour line of another tuned object located in a position close to the virtual screen 302, the contour line is configured to be drawn for each tuned object. Accordingly, there is no case that the contour line of the tuned object located on the inner side becomes indistinct, and accordingly, a natural image from which the user does not acquire a feeling of strangeness is generated.

In addition, pixels included in each tuned object are sequentially become a target pixel, and a pixel that is apart from the target pixel by the line width of the contour line set for the tuned object is set as a determination pixel. In addition, when the determination pixel has a smaller depth (the determination pixel is located in a position close to the virtual screen 302) and a thinner line width than the target pixel, the line width of the target pixel is overwritten by the line width data set for the determination pixel. In addition, a pixel apart from the target pixel by the overwritten line width data is set as a new determination pixel. When there is a difference between the depth data of the target pixel and that of the new determination pixel, the target pixel is set as a contour line pixel, and the contour line data is written. Accordingly, a part that generates a feeling of strangeness in the generated image in a case where the contour line of the part is drawn in its original line width can be found assuredly.

The line color 403 of the contour line of each tuned object is set to a color of a color series different from the color of its main body depending on the color of the main body. In addition, in the contour line of a part in which a plurality of tuned objects is overlapped with one another, although the line width of the contour line may be set to be thinner than its original line width, however, the contour lines of all the plurality of the tuned objects are drawn. Accordingly, even when the line color 403 of one of the overlapped tuned objects is close to the color of the main body of the other overlapped tuned object, it is not difficult to recognize the contour line detected in the overlapped part.

In addition, since a player character is configured as a tuned object, at least one tuned object is necessarily exists in the clipping range, and a non-tuned object may exist in the clipping range. When a tuned object is not overlapped with a non-tuned object in an image generated by a perspective transformation process, the contour line is drawn in the entire contour of the tuned object. Accordingly, a player can clearly recognize the outer shape of tuned objects including the player character.

On the other hand, when a non-tuned object exists, a tuned object and a non-tuned object may be overlapped with each other in the image generated by the perspective transformation process. Even when the contour line of the tuned object is detected in a part in which the tuned object is overlapped with the non-tuned object located in a position closer to the virtual screen 302 than the tuned object, the contour data written in the contour data process buffer 163c for pixels of this part is not combined with the image data written in the image data process buffer 163a by performing a perspective transformation process for the tuned object and the non-tuned object. In other words, the contour line of the part does not appear on the display screen 122 displayed in the display device 121 as a game screen.

Accordingly, an unnatural image in which the contour line of the tuned object is drawn in a shape different from its original shape and an impression that the tuned object in the shape different from its original shape is lifted up is given to a player is not displayed on the display screen 122. In addition, even when the tuned object is overlapped with a non-tuned object having a complex shape which is located in a position close to the virtual screen 302, the boundary is not detected as a contour, and the contour line is not drawn. Accordingly, the image displayed on the display screen 122 as a game screen does not give the player a feeling of disorder.

When the tuned object is perspective transformed, RGB component image data of the tuned object and the depth data representing a depth from the virtual screen 302 are written together for each pixel in the image data process buffer 163a. In addition, the normal line data of the tuned object and the line width data of the contour line which is calculated based on the reference width of the contour line of the tuned object and the distance from the viewing point 303 are written for each pixel in the normal line data process buffer 163b. Since the depth data is also used for another process such as a hidden surface removing process, the depth data can be used effectively for detecting the contour of the tuned object.

When a plurality of objects is included in the clipping range, there are many cases that the depth data of the objects is markedly different from one another, particularly for objects overlapped with one another due to the image generated by the perspective transformation process. Accordingly, by referring to the depth data, the contour of the tuned object can be detected and whether another tuned object or a non-tuned object is overlapped with each tuned object can be determined.

Although the contour of an object can be detected by only using the depth data written in the image data process buffer 163a, here the normal line data written in the normal line data process buffer 163b is used together for detecting the contour of the tuned object. Accordingly, even when the contour of the tuned object cannot be appropriately detected by only using the depth data, the contour of the tuned object can be detected appropriately. Generally, the normal line data has a property that directions for pixels are markedly different in a case where adjacent pixels belong to different objects, and accordingly, the normal line data is appropriate for detecting the contour of the tuned object.

As a sequence for generating an image of a game screen for each frame period, first, only tuned objects among the objects included in the clipping range are perspective transformed. Then, contours of the tuned objects are detected based on data generated by the perspective transformation process, and contour line data of the contour lines of the tuned objects is written into the contour line data process buffer 163c for each pixel. Thereafter, non-tuned objects included in the clipping range are perspective transformed, and at this moment, the contour line data is combined with image data acquired from performing a perspective transformation process for the objects written in the image data process buffer 163a for each pixel.

In this process sequence, an image for each frame period is generated. Accordingly, the boundary of an overlapped part in a case where the tuned object is overlapped with a non-tuned object located in a position close to the virtual screen 302 is not detected as the contour of the tuned object. Since redundant contours are not detected as the contours of the tuned objects, the process load does not increase unnecessarily.

In a pixel in which a tuned object of which image data is written in advance by the perspective transformation process for the non-tuned object is overlapped with a non-tuned object located in a position closer to the virtual screen 302 than the tuned object, the depth data written in the image data process buffer 163a is updated. However, for a pixel for which the depth data is configured, even when the contour line data is written in the contour line data process buffer 163c, the contour line data is not composed with the image data written in the image data process buffer 163a. Accordingly, an unnatural image in which the contour line of the tuned object is seen within the area of the non-tuned object is not generated.

The present invention is not limited to the above-described embodiment, and various modifications or applications can be made therein. Hereinafter, modified examples of the above-described embodiment of the present invention will be described.

In the above-described embodiment, a process for composing the image data and contour line data of the tuned object and the non-tuned object is performed by writing any one between image data of RGB components written in the image data process buffer 163a for each pixel by the perspective transmission process and the contour line data of RGB components written in the contour line data process buffer 163c for each pixel into the frame buffer 112 (or the normal line data process buffer 163b).

For the process, it may be configured that the image data of RGB components written in the image data process buffer 163a for each pixel is overwritten with the contour line data of RGB components written in the contour line data process buffer 163c for each pixel and then data of the image data process buffer 163a is transferred to the frame buffer 112. The process for composing the image data and contour line data of the tuned object and the non-tuned object may be performed by overwriting the image data of RGB components written in the image data process buffer 163a into the contour line data process buffer 163c in which contour line data is written in accordance with the depth data and then transferring the data of the contour line data process buffer 163c to the frame buffer 112.

When the composed image data is configured to be written into the image data process buffer 163a, the normal line data process buffer 163b, or the contour line data process buffer 163c, the process buffers 163a to 163c may be used as the frame buffer 112. However, in such a case, it is required that two sets of the image data process buffers 163a, the normal line data process buffers 163b, or the contour line data process buffers 163c are prepared and the process buffers are shifted between a data writing mode and a data reading mode for each frame.

In the above-described embodiment, the line color 403 of the contour line 202 of the tuned object 200 is set to a color of a color series different from the color of the tuned object main body 201, based on the color of the tuned object main body 201. However, the line colors of the contour lines 202 may be set to a same color for all the tuned objects regardless of the colors of the tuned object main bodies 201. Although the colors of the contour lines 202 of the tuned objects are set to colors of a same series, the brightness of the contour line may be set based on the brightness of the tuned object main body 201.

For example, for the contour line 202 of the tuned object 200 of which tuned object main body 201 has relatively high brightness, a color having a relatively high brightness (brightness lower than that of the tuned object main body 201) may be used. On the other hand, for the contour line 202 of the tuned object 200 having low brightness, a color having low brightness may be used. In such a case, even when a tuned object located close to the viewing point 303 of the virtual camera 301 has low brightness of the main body which is close to that of the main body of a tuned object located far from the viewing point 303, contour lines of both the tuned objects are drawn in a part in which a plurality of tuned objects is overlapped with one another. Accordingly, there is no case that the contour lines of the tuned objects are hard to be recognized.

In addition, when the contour lines of the tuned objects are drawn as translucent images, the transparency may be set in accordance with brightness of the tuned object main body 201. In such a case, a same advantage as that for a case where the brightness of the contour line is set in accordance with the brightness of the tuned object main body 201 can be acquired. As described above, when the brightness or transparency of the contour line 202 is set in accordance with the brightness of the tuned object main body 201, particularly in a case where a monochrome image is generated or the like, the advantage that the contour lines of the tuned objects can be easily recognized in a case where a plurality of the tuned objects are overlapped with one another becomes prominent.

In order to draw the contour line image of the tuned object as a translucent image, in the process of Step S404, the graphic process unit 111 composes the image data written in the image data process buffer 163a for a pixel to be processed and the contour line data written in the contour line data process buffer 163c for the pixel based on translucency of the contour line and writes the composed data into a corresponding pixel of the frame buffer 112.

In the above-described embodiment, the line width W of the contour line of each tuned object included in the clipping range is calculated based on the reference width (Eb) 402 set in advance for each tuned object and a distance D from the viewing point 303 of the virtual camera 301 to each tuned object. However, the line width W of the contour line of each tuned object may be calculated based on a depth from the short-distance clip surface (the virtual screen) 302 to each tuned object, which is used as a distance D, and the reference width (Eb) 402. In such a case, the line widths of the contour lines can be precisely calculated in accordance with sizes of the tuned objects in the two-dimensional image generated by the perspective transformation process.

In the above-described embodiment, for a tuned object corresponding to a character that has the value of HP as zero or is behaviorally incapacitated due to occurrence of special status abnormality, the value of coefficient "a" that is determined in accordance with the progress status of the game is set to zero. Accordingly, the line width W is calculated as zero, and thereby a contour line does not appear in the tuned object of the character on the game screen. However, a technique for generating a character without the contour line in accordance with the progress status of the game is not limited thereto. Thus, a technique in which a character is dynamically shifted between the tuned object and the non-tuned object and, for example, when the character is behaviorally incapacitated, the character may be configured to be shifted to the non-tuned object.

In the above-described embodiment, the contour line drawing process is performed by overwriting the line width data of the normal line data process buffer 163b in a case where the depth data of the determination pixel is smaller than the depth data of the target pixel. However, the process may be performed by using a local variable, and the line width data written in the normal line data process buffer 163b may be configured not to be overwritten. In such a case, the process of Step S303 may be configured not to be performed.

In the above-described embodiment, the contour line of each tuned object in the image data that has been perspective transformed is detected by referring to the depth data for each pixel which is written in the image data process buffer 163a together with the image data of RGB components and the normal line data and the contour line data for each pixel which are written in the normal line data process buffer 163b. However, the contour line of each tuned object may be detected by referring to any one between the depth data for each pixel which is written in the image data process buffer 163a and the normal line data for each pixel which is written in the normal line data process buffer 163b. When the contour line is configured to be detected by using the depth data only, a process buffer in which the normal line data is written is not needed. Accordingly, the normal line data process buffer 163b may not be provided, and the line width data representing the line width of the contour line of each tuned object may be stored in the RAM inside the graphic process unit 111 or the like.

In addition, information for detecting the contour line of the tuned object is not limited to the above-described depth data or normal line data. For example, in addition to the image acquired from performing a perspective transformation process for the tuned object, an image for detecting the contour line is drawn in another process buffer, and the contour line of each tuned object may be detected by referring to the image for detecting the contour line which is drawn in the process buffer.

In the above-described embodiment, loop process 3 is performed by sequentially setting each pixel inside the tuned object that is included in the two-dimensional image generated by the perspective transformation process as a target pixel in drawing of the contour line. However, in a pixel that has not been detected as a contour of the tuned object in Step S104, the contour line is not drawn in any case. Thus, in loop process 2, only pixels detected as contours in Step S104 may be sequentially set as a target pixel.

In the above-described embodiment, the line width of the contour line to be drawn in each tuned object is calculated based on the distance from the viewing point 303 of the virtual camera 301 to each tuned object and the like by using the reference width 402 set in each tuned object in advance as a base. In addition, the line width of the contour line of a part in which a plurality of tuned objects is overlapped with one another is adjusted or contour line data representing the contour line of a part in which a tuned object and a non-tuned object is overlapped with each other is not composed.

However, instead of changing the line width of the contour line of each tuned object in accordance with setting of the virtual camera 301, the line with of the contour line of each tuned object may be configured to be registered in the contour line data table 400 instead of the reference width 402 set for each tuned object in advance. In such a case, the contour line of each tuned object is drawn in the line width that is registered in the contour line data table 400 instead of the reference width 402, regardless of the size of each tuned object in the two-dimensional image generated by the perspective transformation process.

In such a case, when a tuned object having a small line width of the contour line is overlapped with a tuned object having a large line width of the contour line located in a position close to the virtual screen 302, the line width of the contour line set for the tuned object located in the position close to the virtual screen 302 may be used as the line widths of the contour lines to be drawn in the contour lines of both tuned objects in an overlapped part. In addition, when a tuned object is overlapped with a non-tuned object located in a position close to the virtual screen 302, contour line data of the contour line of the tuned object located in the overlapped part may be configured not to be combined with the image data acquired by the perspective transformation process for the object.

In addition, the line widths of the contour lines of tuned objects may be set to a same line width in advance. In such a case, the contour lines of the tuned objects are drawn in the same line width regardless of the sizes of the tuned objects in the two-dimensional image generated by the perspective transformation process. In such a case, when a tuned object is overlapped with a non-tuned object located in a position close to the virtual screen 302, contour line data of the contour line of the tuned object located in the overlapped part may be configured not to be combined with the image data acquired by the perspective transformation process for the object.

In the above-described embodiment, the contour line of a line width calculated based on the reference width which has been set in advance is drawn in the tuned object. In addition, when the tuned object is overlapped with another tuned object having a smaller line width of the contour line which is located in a position close to the virtual screen 302, the contour line of the overlapped part is configured to be drawn in a same line width as that of the contour line of the another tuned object. In addition, when the tuned object is overlapped with a non-tuned object located in a position close to the virtual screen 302, in the overlapped part, the contour line is not drawn.

However, an object among the tuned objects which is required to be visually distinguished may be set as a specific tuned object. In addition, even when the specific tuned object is overlapped with another object (a tuned object other than the specific tuned object or a non-tuned object) located in a position close to the virtual screen 302, the contour line of the specific tuned object including the overlapped part may be drawn in a line width calculated based on the reference width, and the contour line data may be composed with the image data of the object.

As described above, in the entire contour of the specific tuned object, the contour line having the original line with is drawn. Accordingly, the player can easily identify an area in which the specific tuned object is displayed on the game screen. In addition, when the player character and the non-player character become tuned objects, the specific tuned object may be used as the player character. In addition, when there is another tuned object other than the character, the character is set as a specific tuned object, and tuned objects other than the character is set as tuned objects other than the specific tuned object.

In addition, the specific tuned object may be dynamically determined in accordance with the progress status of the game. For example, when the progress status of the game is a predetermined status, all the tuned objects may be treated as the specific tuned objects. In such a case, when the tuned object is overlapped with another object located in a position close to the virtual screen 302, the contour lines of the tuned objects including the overlapped part are drawn in the line widths that are calculated based on the reference widths of the tuned objects, and the contour line data is combined with the image data of the object.

Accordingly, when the progress status of the game is the predetermined status, the player can easily identify the areas in which the tuned objects are displayed on the game screen. In addition, in the progress status of the game for which the above-described process is performed, a scene in which the player wants to identify the areas occupied on the game screen by the tuned objects may be used. As an example of such scene, there is a scene in which the player shoots a target (may be in a moving status) displayed on the screen by pointing a desired position on the screen.

In the above-described embodiment, the value of coefficient "a" for a tuned object representing a character that has the value of HP as zero or is behaviorally incapacitated due to occurrence of special status abnormality becomes zero, and accordingly, the line width of the contour line of the tuned object may be set to zero. In addition, another tuned object (having the line width of a non-zero value) may be overlapped with the tuned object, for which the line width of the contour line is set to zero, located in a position close to the virtual screen 302. In such a case, even in the overlapped part of the contour line of the another tuned object, the contour line (the line width may be set to "1") may be configured to be drawn. Accordingly, there is no case that the tuned object is wrongly viewed to be overlapped with a non-tuned object of the another object.

In the above-described embodiment, the contour line of the tuned object other than pixels of a part overlapped with the non-tuned object located in a position close to the virtual screen 302 is necessarily combined with the image data of the object, except for a case where the line width W is calculated as zero and appears in the image displayed on the display screen 122 as a game screen. In addition, when the non-tuned object located in a position close to the virtual screen 302 has a complex shape, a contour line that is continuous in a short length appears, too. However, when the contour line is intermittently continuous in a very short length, particularly in a case where the line width of the contour line is thick, there may be a case that a part in which very short contour lines appear is felt to be disordered.

Accordingly, when a part that is the contour line of a tuned object and is not overlapped with a non-tuned object located in a position close to the virtual screen 302 is not continuous in a predetermined length or more, the contour line data may be configured not to be combined with the image data of the object. The predetermined length that becomes a criterion for determining whether the contour line data is to be combined with the image data of the object may be configured to be determined based on the line width of the contour line.

For example, in order to determine whether a part of the contour line of the tuned object which is not overlapped with a non-tuned object located in a position close to the virtual screen 302 is continuous for a predetermined length (for example, a three-pixel length) or more, first, it is assumed that the contour line is drawn in a line width of one pixel. Here, anyone pixel of the contour line data is set as a reference pixel, 8 neighbor pixels around the reference pixel are checked, and it is determined whether there is contour line data. When there is no contour line data in any one of the 8 neighbor pixels, it can be determined that the contour line is not continuous for a three-pixel length. When there is the contour line data in only one pixel among the neighbor 8 pixels, the pixel having the contour line data is set as anew reference pixel, 8 neighbor pixels around the new reference pixels are checked, and it is determined whether there is contour line data. Here, when there is no contour line data in only one pixel among the neighbor 8 pixels, it can be determined that the contour line is not continuous for a three-pixel length. When the predetermined length is larger than a three pixel length, the above-described process is repeated.

Figure 15:
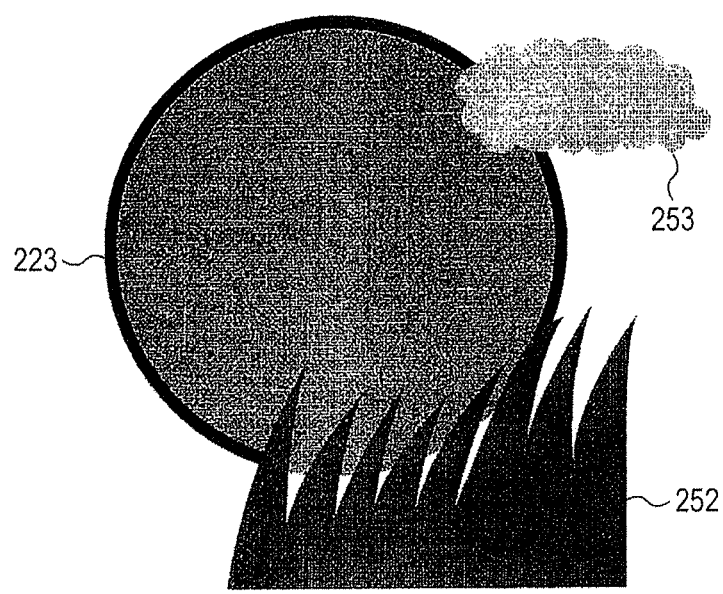
FIG. 15 is a diagram showing a modified example in which a tuned object and a non-tuned object are overlapped with each other.

FIG. 15 is a diagram showing an example in which contour line data of a part, not overlapped with a non-tuned object located in a position close to the virtual screen 302, of the contour line of a tuned object which is not continuous for a predetermined length or more is not composed with the image data in a case where the tuned object and the non-tuned object are overlapped with each other. As shown in the figure, in a part having a small interval of gaps among gaps generated in the non-tuned object 252 located in a position close to the virtual screen 302, the contour line of the tuned object 223 does not appear.

As described above, even when the shape of the non-tuned object in the two-dimensional image generated by the perspective transformation process is complex and a complex-shaped part of the non-tuned object is overlapped with a part near the contour line of the tuned object, very short contour lines of the contour of the tuned object do not appear intermittently in an image that is generated finally. Accordingly, it can be prevented that the game screen is felt to be disordered due to the very short contour lines that appear intermittently. In particular, as the line width of the contour line drawn in the tuned object increases, the advantage becomes more prominent.

In the above-described embodiment, it is assumed that the plurality of objects existing in the virtual three-dimensional space is apart from one another. However, among the plurality of objects existing in the virtual three-dimensional space, a state in which a part of one object is put into another object may be allowed. In such a case, a part of one tuned object may be put into another tuned object. In such a case, a boundary part in which the one tuned object is put into another tuned object is detected as the contour lines of the tuned objects.

In the contour that is detected in the boundary part in which one tuned object is put into another tuned object, the contour line may be configured to be drawn or not to be drawn (or although the contour line data is written, the contour line data is not combined with the image data acquired from performing the perspective transformation process for the objects). Particularly when the colors of the main bodies of both the tuned objects are of different color series, the contour line may be configured not to be drawn in the contour detected in the boundary part.

In a case where the contour line is drawn in the contour detected in the boundary part in which one tuned object is put into another tuned object, the line width of the contour line for the part may set to a width of one pixel that is the minimum unit, regardless of the line width W that is calculated in accordance with the distance D from the viewing point 303 of the virtual camera 301 to the tuned objects. Alternatively, the contour line of a one-pixel width may be drawn only in the contour detected for the another tuned object into which one tuned object is put.

Figure 16:
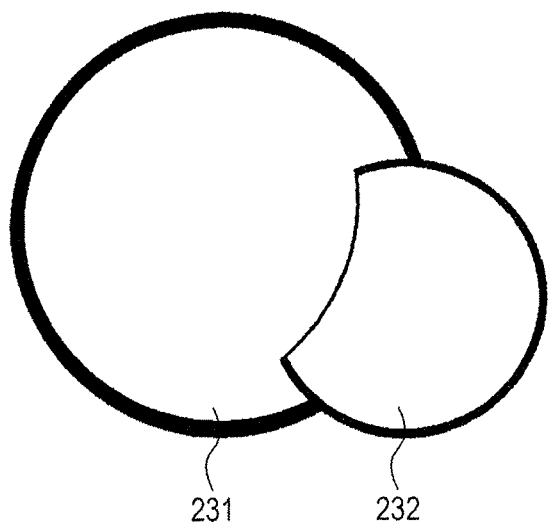
FIG. 16 is a diagram showing a modified example in which a part of one tuned object is put into another tuned object.

FIG. 16 is a diagram showing an example of an image of two tuned objects displayed as the display screen 122 in a case where a part of one tuned object is put into another tuned object. Here, it is assumed that a part of the tuned object 232 is put into another tuned object 231. As shown in the figure, a contour line having a very thick contour line is drawn in the tuned object 231 having a large size displayed on the display screen 122, and a contour line that has a relatively thick line width and is thinner than that of the tuned object 231 is drawn in the tuned object 232 having a size smaller than the tuned object 231. However, in the contour of a part in which the tuned object 232 is put into the tuned object 231, only a contour line having a very thin line width appears.

In such a case, when a part of one tuned object is put into another tuned object, a contour line having a minimum width is drawn in the contour detected in the put part regardless of the line widths of the contour lines calculated for both the tuned objects. Accordingly, the contour line of the contour detected in the put part is not distinguished excessively, and therefore an image causing an impression that both objects exist independently and one of the objects is lifted up is not generated. Although the line width has a minimal width of one pixel, a detectable contour line is drawn in the part in which a part of one tuned object is put into another tuned object. Accordingly, it can be prevented to cause a player to feel that both objects are completely integrated one object.

In addition, when one tuned object is put into another tuned object, in the put part, the depth data is not changed, but the normal line data is changed markedly. Accordingly, in the above-described process for detecting the contour of the tuned object, a part in which the depth data is not changed and the normal line data is changed is searched, and the part is extracted as a part in which one tuned object is put into another tuned object.

In the above-described embodiment, in each frame period, first, only tuned objects among objects existing in the clipping range are perspective transformed. Here, the contours of the tuned objects are detected, and the contour lines thereof are drawn. Thereafter, non-tuned objects existing in the clipping range are perspective transformed. Then, at a time point when the non-tuned objects have been perspective transformed, the contour line data written in the contour line data process buffer 163c for each pixel is combined with the image data written in the image data process buffer 163a for each pixel.

On the contrary, in each frame period, it may be configured that a perspective transformation process for objects existing in the clipping range, regardless whether the objects are tuned objects or non-tuned objects, is performed first. Then, contours of the objects are detected, and contour lines are drawn in the contours of the tuned objects. Thereafter, the contour line data written in the contour line data process buffer 163c for each pixel is combined with the image data written in the image data process buffer 163a for each pixel.

FIGS. 17A to 17D, as a modified example, are schematic diagrams showing a sequence for generating image data of an image displayed as a game screen during each frame period. When a process for the sequence of the modified example is performed, it is assumed that the position of the viewing point 303 of the virtual camera 301 and the direction of the viewing axis 304 are determined and the clipping range is determined, as a premise.

Figure 17A:
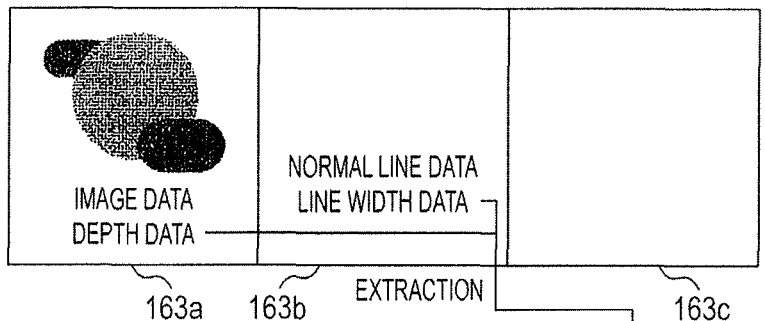
FIGS. 17A to 17D are schematic diagrams showing a modified example of a sequence for generating image data of an image displayed as a game screen during each frame period.

First, all the objects included in the clipping range, regardless whether they are tuned objects or non-tuned objects, are perspective transformed. Accordingly, as shown in FIG. 17A, the image data of RGB components and the depth data of each object included in the clipping range are written into the image data process buffer 163a for each pixel, and the normal line data of each object is written into the normal line data process buffer 163b for each pixel. Here, in pixels of a part in which a plurality of objects is overlapped with one another, the image data and the normal line data of an object having the least depth data (that is, an object located in a position closest to the virtual screen 302) are written. In addition, the line widths of the contour lines of the tuned objects are calculated, and the line width data is written into the normal line data process buffer 163b.

Figure 17B:
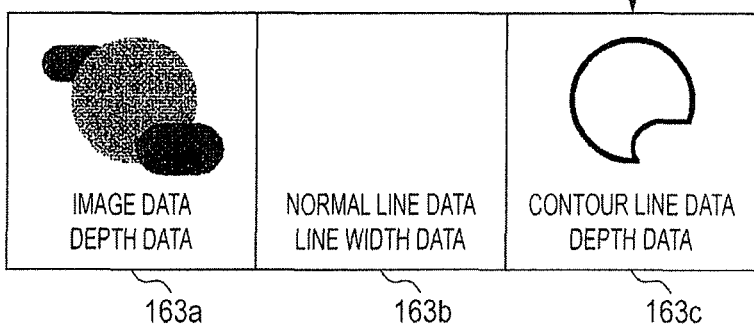

Next, as shown in FIG. 17B, the contours of the tuned objects included in the clipping range are detected by referring to the depth data written in the image data process buffer 163a and the normal line data and the line width data written in the normal line data process buffer 163b. Although a technique for detecting the contours is the same as that for detecting the contour lines of the tuned objects according to the above-described embodiment, here, a contour is detected in a part in which a tuned object and a non-tuned object are overlapped with each other. Then, the contour line data of the detected contour lines of the tuned objects is written at once into the contour line data process buffer 163c together with the depth data.

Figure 17C:
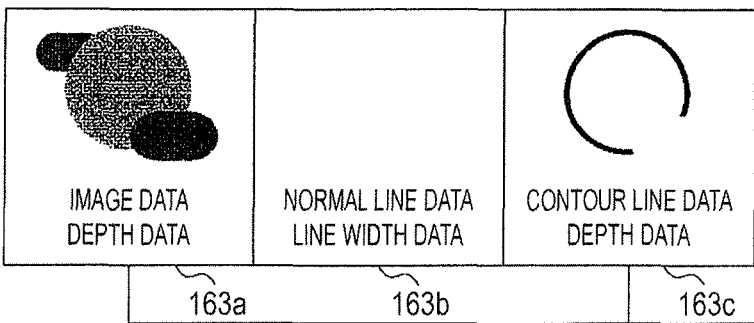

Next, the contour line data written in the contour line data process buffer 163c is set as a process target for each pixel, and it is checked whether, the image data of a pixel shifted from the target pixel by the line width of the contour line which is written in the image data process buffer 163a is image data of a non-tuned object having a less depth data than the contour line data. When the image data of the pixel shifted by the line width of the contour line is image data of a non-tuned object having less depth data than the contour line data, the contour line data of the pixel is removed from the contour line data process buffer 163c. Accordingly, as shown in FIG. 17C, in the contour line data process buffer 163c, only contour line data of a part, which is not overlapped with the non-tuned object, of the contour lines of the tuned object is written.

Figure 17D:
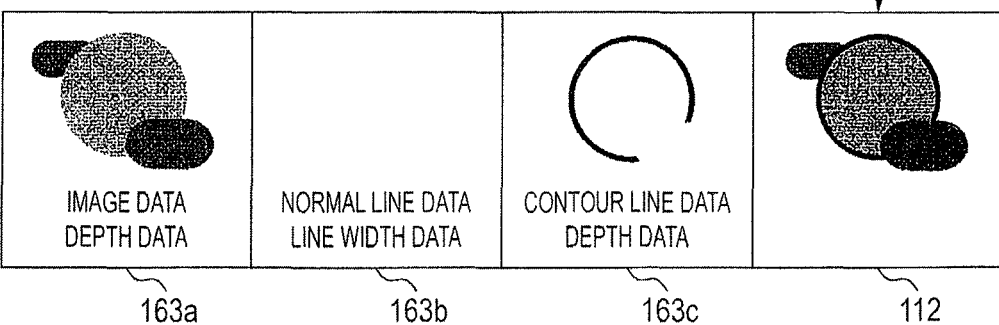

Finally, image data acquired from composing the contour line data written in the contour line data process buffer 163c with the image data of the tuned objects and the non-tuned objects written in the image data process buffer 163a is written into the frame buffer 122. Accordingly, as shown in FIG. 17D, an image in which contour lines are drawn in parts other than a part in which a tuned object or a non-tuned object is not overlapped with a non-tuned object located in a position close to the virtual screen 302 is generated in the frame buffer 122.

As described above, in this modified example, objects included in the clipping range, regardless whether they are tuned objects or non-tuned objects, are perspective transformed, first. In addition, a boundary part between a tuned object and a non-tuned object in the image generated by the perspective transformation process is detected as the contour of the tuned object even in a case where the non-tuned object is located in a position close to the virtual screen 302.

However, the contour line data of the boundary part is removed from the contour line data process buffer 163c in a case where the non-tuned object is located in a position close to the virtual screen 302, and only the contour line data from which the part is removed is combined with the image data of the tuned object and the non-tuned object. Accordingly, even when the contour line data is composed with the image data that is acquired by performing a perspective transformation process for the objects, which include tuned objects and non-tuned objects, included in the clipping range, the contour line does not appear in the part of the image that is generated finally. Therefore, a same advantage as that of the above-described embodiment can be acquired.

In addition, in the example shown in FIGS. 17A to 17D, as shown in FIG. 17B, after contour line data is written for the all contours detected from the image acquired from perspective transforming the tuned objects and the non-tuned objects, as shown in FIG. 17C, contour line data of a part in which a tuned object is overlapped with a non-tuned object located in a position close to the virtual screen 302 is removed. However, for each pixel detected as a contour in the image acquired from performing a perspective transformation for the tuned objects and the non-tuned objects, a non-tuned object is overlapped in a position close to the virtual screen 302 is determined. Then, into a pixel in which the non-tuned objects is overlapped in a position close to the virtual screen 302, the contour line data may be configured to be written.

A process for removing a contour line of a tuned object in an image that is finally generated as a game screen according to an embodiment of the present invention may be implemented by performing any one of the following processes. There are a process in which the contour line data written in the contour line data process buffer 163c is not combined with the image data written in the image data process buffer 163a, as in the above-described embodiment, a process in which the contour line data written in the contour line data process buffer 163c is removed, a process in which the line width of the contour line is set to zero for the contour line data not to be written into the contour line data process buffer 163c, a process in which the line width of the contour line is not set to zero and the contour line data of pixels of a part in which a contour line is not to appear is not written into the contour line data process buffer 163c, and a process in which an originally tuned object is treated as a non-tuned object dynamically.

In the above-described embodiment, for a tuned object corresponding to a character that has the value of HP as zero or is behaviorally incapacitated due to occurrence of special status abnormality, zero is set as coefficient "a" corresponding to the progress status of the game, and accordingly, the contour line is configured not to appear on the game screen. However, the game status in which the contour line to be drawn originally for a tuned object is not drawn is not limited thereto. The game status may include a status in a scene (for example, a scene in which a player character explores in the darkness) in which high realistic sensation can be implemented in a case where the tuned object is not visually distinguished.

In addition, coefficient "a" that is used as a multiplier for calculating the line width of the contour line is not limited to be set to "0". As a progress status of the game for which a value other than "1" is set, a case where a parameter (for example, an experience value, a level, or the like) other than HP which is set for the character is a predetermined value may be used. In addition, a difference (for example, located on a rock, in the water, in the space, or the like) of surrounding environment such as terrain of the game space in which the player character is located may be used.

In addition, in a battle scene, a plurality of player characters appears, and each one of the player characters is in an active statue one after another, and a different between the active status/non-active status of the player characters may be used. In addition, a difference of the numbers of player characters configuring parties in the game may be used (for example, as the number of the player characters configuring the party increases, the contour lines of the tuned objects corresponding to the player characters become thinner). In addition, a difference of scenes (a difference between an event scene and a battle scene, a difference between a day scene and a night scene) in the game may be used.

In a battle scene, a difference of superior status/inferior status of a player character or an enemy character for the opponent character may be used. In an event scene, whether an event set in the scene is cleared/not cleared by the player character may be used. When a tuned object is used as an item that can be used in the game by the player character, a difference between use/non-use of the item may be used. In addition, when a tuned object is used as a treasure box (a box in which items that can be used by the player character are stored) existing in the game space, a difference between open state/non-open state of the treasure box may be used.

In addition, in the above-described embodiment, the light source is set to the position of the virtual camera. However, when the light source is set in a position different from that of the virtual camera, in a process for calculating the line width of the contour line of the tuned object, a predetermined coefficient determined based on the distance from the light source to each tuned object may be configured to be used as a multiplier.

In addition, the line width of the contour line may be changed in accordance with a difference of types (for example, a player character or a non-player character) of the tuned objects. However, as the player character and the non-player character, when types of the tuned objects are not changed in accordance with the progress status of the game, the reference width 402 is set in advance. For example, even when the reference sizes are approximately the same, the reference width 402 is set to be large for a player character, and the reference width 402 is set to be small for a non-player character.

In the above-described embodiment, a character is set to a tuned object. In other words, a tuned object is an object that is recognized as an object having integrity by a player, and a contour line is drawn in the contour of the range that is recognized as an object having integrity. However, for example, there is a case where there are a part of a character for which the contour line is desired to be drawn and a part of the character for which the contour line is desired not to be drawn. In such a case, although an object is recognized to have integrity, the object may have a part configured by a tuned object and a part configured by a non-tuned object. For example, an object of a horse carriage has the part of a horse configured as a non-tuned object and the part of a carriage configured as a tuned object.

In the above-described embodiment, the technique for generating an image according to an embodiment of the present invention is used for generating an image in a stand-alone video game. However, the technique may be applied for generating an image in a network game in which a game progresses by connecting a plurality of video game apparatuses 100 to a server through a network 151. All the player characters for each player in the network game which are operated in accordance with the operations of players using the video game apparatuses 100 in a game space may be configured by tuned objects.

In the network game, among player characters of other players, there are player characters that are configured as comrades (cooperative relationship is build for progress of the game) of the player character of the player and player characters that are configured not to be comrades. In addition, in the network game, there is a non-player character that is not operated by players on any side in the game space. The non-player character may be configured as a tuned object.

In such a case, when the line widths of the contour lines of the tuned objects are calculated in accordance with the individually set reference widths, coefficients having different values may be multipliers in accordance with whether the tuned object is a player character of the player, a player character of another player which is set to be a comrade, a player character of another player which is set to be not a comrade, or a non-player character. In such a case, for example, among a plurality of characters existing in the game space, the contour line of the player character of another player which is set to be a comrade to the player character of the player is set to be relatively thick, compared to the size displayed on the display screen 122, and accordingly, the characters are represented to be visually distinguished in an easy manner.

In addition, for a case other than a case where an image of a video game is generated, an image is generated by performing a perspective transformation process for objects existing in the virtual three dimensional space using a three-dimensional computer graphic process and there are a tuned object for which the contour line is drawn and a non-tuned object for which the contour line is not drawn among the objects existing in the virtual three-dimensional space, the process for generating an image according to an embodiment of the present invention can be applied.

In the above-described embodiment, the technique for generating an image according to an embodiment of the present invention is applied for generating an image in a video game, and as terminal devices used for progress of the game by players, video game apparatuses 100 that are game-dedicated machines are used. However, a general-purpose computer may be used as long as it includes same constituent elements as the video game apparatus 100 and has a function for drawing an image. In addition, a portable game device (including a cellular phone having a function for executing an application) having a configuration in which a display device 121 and a sound output device 125 are housed in a casing of a device main body 101 may be used, as long as it can process three dimensional computer graphics and has a process capability for data written in the process buffer 163 in units of pixels.

As the recording medium 131, a semiconductor memory card instead of a DVD-ROM or a CD-ROM may be used. A card slot for inserting the memory card, instead of the DVD/CD-ROM drive 113, may be provided. For the general-purpose personal computer, a program and data according to an embodiment of the present invention may be stored in the HDD 107 in advance and provided, instead of storing and providing them in the recording medium 131. As the recording medium for storing and providing the program and the data according to an embodiment of the present invention, an arbitrary one depending on the physical shape of hardware and a distribution form.

In the above-described embodiment, the program and data of the video game apparatus 100 are configured to be stored in the recording medium 131 to be distributed. However, it may be configured that the program and data are stored in a fixed disc device included in the server existing on the network 151 and the program and the data are distributed to the device main body 101 through the network 151. In the video game apparatus 100, the program and data received from the server by a communication interface 115 are stored in the HDD 107, and the program and data may be loaded into the RAM 105 for execution.

What is claimed is:

1. An image generating apparatus for generating an image in which a contour line is drawn in a target object among a plurality of objects existing in a virtual three-dimensional space and is not drawn in a non-target object among the plurality of objects other than the target object, the image generating apparatus comprising:
a virtual camera setter that sets a viewing point of a virtual camera and a direction of a viewing axis in the virtual three-dimensional space to a predetermined position and a predetermined direction;
a two-dimensional image drawer that draws a two-dimensional image acquired from performing a perspective transformation process for the plurality of objects in accordance with the viewing point and the direction of the viewing axis of the virtual camera set by the virtual camera setter;
a contour detector that detects a contour of the target object included in the two-dimensional image drawn by the two-dimensional image drawer;
an overlap determiner that determines whether the target object is overlapped with the non-target object, the non-target object being located closer to the viewing point of the virtual camera than the target object in the two-dimensional image drawn by the two-dimensional image drawer;
a contour line drawer that draws the contour line in the contour of the target object detected by the contour detector; and
an image generator that generates the image composed of the two-dimensional image drawn by the two-dimensional image drawer and the contour line drawn by the contour line drawer,
wherein when the target object is determined not to be overlapped with the non-target object by the overlap determiner, the contour line drawer draws the contour line in an entirety of the contour of the target object which is detected by the contour line detector,
wherein when the target object is determined to be overlapped with the non-target object by the overlap determiner, the contour line drawer draws the contour line in a first part of the contour of the target object other than a second part of the contour of the target object that is determined to be overlapped with the non-target object, and
wherein when the target object is determined to be overlapped with the non-target object by the overlap determiner, the contour line drawer is configured to draw the contour line in the first part of the contour of the target object only when the first part of the contour is at least a predetermined length and to not draw the contour line in the first part of the contour of the target object when the first part of the contour is smaller than the predetermined length.

2. The image generating apparatus according to claim 1, wherein the two-dimensional image drawer stores image data of the two-dimensional image of the plurality of objects in a two-dimensional image storage together with depth data representing a distance from a short-distance clip surface which is determined based on the viewing point and the direction of the viewing axis of the virtual camera for each of the plurality of objects that is located on a side close to the viewing point of the virtual camera, and
wherein the overlap determiner determines whether the target object is overlapped with the non-target object with the non-target object being located closer to the viewing point of the virtual camera than the target object by comparing the depth data of the target object which is stored in the two-dimensional image storage with the depth data of the non-target object.

3. The image generating apparatus according to claim 2, wherein the contour detector detects the contour of the target object included in the two-dimensional image drawn by the two-dimensional image drawer based on the depth data of the target object stored in the two-dimensional image storage.

4. The image generating apparatus according to claim 1, wherein the two-dimensional image drawer stores image data of the two-dimensional image of the plurality of objects in a two-dimensional image storage and stores contour detection data different than depth data, representing a distance from a short-distance clip surface that is determined based on the viewing point and the direction of the viewing axis of the virtual camera, for extracting the contour of the target object in a detection data storage, and
wherein the contour detector detects the contour of the target object included in the two-dimensional image drawn by the two-dimensional image drawer based on the contour detection data stored in the detection data storage.

5. The image generating apparatus according to claim 4, wherein the contour detection data is normal line data of the target object.

6. The image generating apparatus according to claim 1, wherein the target object is one of a plurality of target objects included in the plurality of objects,
wherein the image generating apparatus further comprises a contour line width setter that sets a line width of the contour line to be drawn in the contour detected by the contour detector for each of the plurality target objects included in the two-dimensional image drawn by the two-dimensional image drawer, and
wherein the contour line drawer draws the contour line in the contour detected by the contour detector with the line width set for each of the plurality of target objects set by the contour line width setter.

7. The image generating apparatus according to claim 1,
wherein the two-dimensional image drawer includes a first image drawer that draws a first two-dimensional image acquired from perspectively transforming the target object and a second image drawer that draws a second two-dimensional image acquired from perspectively transforming the non-target object after the contour detector detects the contour of the target object, and
wherein the contour detector detects the contour of the target object based on the first two-dimensional image of the target object which is drawn by the first image drawer.

8. The image generating apparatus according to claim 1,
wherein the virtual three-dimensional space is a game space of a video game,
wherein the target object is a character that is operated in the game space of the video game, and
wherein the non-target object is an object other than the character which exists in the game space.

9. The image generating apparatus according to claim 1,
wherein the virtual three-dimensional space is a game space of a video game, and
wherein the contour line drawer does not draw the contour line of the target object when a progress status of the game is a predetermined status.

10. The image generating apparatus according to claim 1,
wherein the virtual three-dimensional space is a game space of a video game, and
wherein the image generator does not combine the contour line drawn by the contour line drawer with the two-dimensional image drawn by the two-dimensional image drawer when a progress status of the game is a predetermined status.

11. The image generating apparatus according to claim 1, wherein the predetermined length is configured to be determined based on a line width of the contour line of the target object.

12. An image generating apparatus for generating an image in which a contour line is drawn in a target object among a plurality of objects existing in a virtual three-dimensional space and is not drawn in a non-target object among the plurality of objects other than the target object, the image generating apparatus comprising:
 a virtual camera setter that sets a viewing point of a virtual camera and a direction of a viewing axis in the virtual three-dimensional space to a predetermined position and a predetermined direction;
 a two-dimensional image drawer that draws a two-dimensional image acquired from performing a perspective transformation process for the plurality of objects in accordance with the viewing point and the direction of the viewing axis of the virtual camera set by the virtual camera setter;
 a contour detector that detects a contour of the target object included in the two-dimensional image drawn by the two-dimensional image drawer;
 an overlap determiner that determines whether the target object is overlapped with the non-target object, the non-target object being located closer to the viewing point of the virtual camera than the target object in the two-dimensional image drawn by the two-dimensional drawer;
 a contour line drawer that draws the contour line in the contour of the target object detected by the contour detector; and
 an image generator that generates the image composed of the two-dimensional image drawn by the two-dimensional image drawer and the contour line drawn by the contour line drawer,
wherein when the target object is determined to be overlapped with the non-target object by the overlap determiner, the image generator is configured not to compose a part of the contour line, which is determined to be overlapped by the non-target object, of the contour of the target object which is detected by the contour detector, and
wherein when the target object is determined to be overlapped with the non-target object by the overlap determiner, the image generator is configured to compose a second part of the contour line, that is different than the first part which is determined to be overlapped by the non-target object, in the contour of the target object only when the second part is at least a predetermined length and to not compose the second part of the contour line in the contour of the target object when the second part is smaller than the predetermined length.

13. The image generating apparatus according to claim 12, wherein the predetermined length is configured to be determined based on a line width of the contour line of the target object.

14. A method of generating an image in which a contour line is drawn in a target object among a plurality of objects existing in a virtual three-dimensional space and is not drawn in a non-target object among the plurality of objects other than the target object and displaying the image in a display, the method comprising:
 setting a viewing point of a virtual camera and a direction of a viewing axis in the virtual three-dimensional space to a predetermined position and a predetermined direction and storing virtual camera information on the viewing point and the direction of the viewing axis of the virtual camera in a storage;
 drawing a two-dimensional image acquired from perspectively transforming the plurality of objects based on the virtual camera information which is stored in the storage and writing the two-dimensional image in the storage;
 detecting the contour of the target object included in the two-dimensional image and storing contour information on the contour in the storage;
 determining whether the target object is overlapped with the non-target object, the non-target object being located closer to the viewing point of the virtual camera than the target object in the two-dimensional image that is drawn and written in the storage;
 drawing a contour line image of the contour line in the contour of the target object based on the contour information which is written in the storage and writing the contour line image of the contour line in the storage; and
 generating the image composed of the two-dimensional image of the plurality of objects which is drawn and written in the storage and the contour line image of the contour line which is drawn and written in the storage and displaying the image in the display,
wherein when the target object is determined not to be overlapped with the non-target object, a contour line is drawn in an entirety of the contour of the target object in the contour line image of the contour line, and
wherein when the target object is determined to be overlapped with the non-target object, the contour line is drawn in a first part of the contour of the target object other than a second part of the contour of the target object that is determined to be overlapped with the non-target object in the contour line image of the contour line, and wherein when the target object is determined to be overlapped with the non-target object, the contour line is drawn in the first part of the contour of the target object only when the first part of the contour is at least a predetermined length and not drawn in the first part of the contour of the target object when the first part of the contour is smaller than the predetermined length.

15. A method of generating an image in which a contour line is drawn in a target object among a plurality of objects existing in a virtual three-dimensional space and is not drawn in a non-target object among the plurality of objects other than the target object and displaying the image in a display, the method comprising:

setting a viewing point of a virtual camera and a direction of a viewing axis in the virtual three-dimensional space to a predetermined position and a predetermined direction and storing virtual camera information on the viewing point and the direction of the viewing axis of the virtual camera in a storage;

drawing a two-dimensional image acquired from perspectively transforming the plurality of objects based on the virtual camera information which is stored in the storage and writing the two-dimensional image in the storage;

detecting the contour of the target object included in the two-dimensional image and storing contour information on the contour in the storage;

determining whether the target object is overlapped with the non-target object, the non-target object being located closer to the viewing point of the virtual camera than the target object in the two-dimensional image that is drawn and written in the storage;

drawing a contour line image of the contour line in the contour of the target object based on the contour information which is written in the storage and writing the contour line image of the contour line in the storage; and generating the image composed of the two-dimensional image of the plurality of objects which is drawn and written in the storage and the contour line image of the contour line which is drawn and written in the storage and displaying the image in the display, and wherein when the target object is determined to be overlapped with the non-target object, a first part of the contour line, which is determined to be overlapped by the non-target object, of the contour of the target object is not composed when generating the image, and wherein when the target object is determined to be overlapped with the non-target object, a second part of the contour line, that is different than the first part which is determined to be overlapped by the non-target object, of the contour of the target object is composed only when the second part is at least a predetermined length and the second part of the contour line of the contour of the target object is not composed when the second part is smaller than the predetermined length.

16. A non-transitory computer-readable medium including a program that allows a computer apparatus to perform a process for generating an image in which a contour line is drawn in a target object among a plurality of objects existing in a virtual three-dimensional space and is not drawn in a non-target object among the plurality of objects other than the target object and displaying the image in a display, the program allowing the computer apparatus to perform:

setting a viewing point of a virtual camera and a direction of a viewing axis in the virtual three-dimensional space to a predetermined position and a predetermined direction and storing virtual camera information on the viewing point and the direction of the viewing axis of the virtual camera in a storage included in the computer apparatus;

drawing a two-dimensional image acquired from perspectively transforming the plurality of objects based on the virtual camera information which is stored in the storage and writing the two-dimensional image in the storage;

detecting the contour of the target object included in the two-dimensional image and storing information on the detected contour in the storage;

determining whether the target object is overlapped with the non-target object, the non-target object being located closer to the viewing point of the virtual camera than the target object in the two-dimensional image that is drawn and written in the storage;

drawing a contour line image of the contour line in the contour of the target object based on the contour information which is written in the storage and writing the contour line image of the contour line into the storage included in the computer apparatus; and generating the image composed of the two-dimensional image of the plurality of objects which is drawn and written in the storage and the contour line image of the contour line which is drawn and written in the storage and displaying the image in the display, wherein when the target object is determined not to be overlapped with the non-target object, a contour line is drawn in an entirety of the contour of the target object in the contour line image of the contour line, and wherein when the target object is determined to be overlapped with the non-target object, the contour line is drawn in a first part of the contour of the target object other than a second part of the contour of the target object that is determined to be overlapped with the non-target object in the contour line image of the contour line, and wherein when the target object is determined to be overlapped with the non-target object, the contour line is drawn in the first part of the contour of the target object only when the first part of the contour is at least a predetermined length and not drawn in the first part of the contour of the target object when the first part of the contour is smaller than the predetermined length.

17. A non-transitory computer-readable medium including a program that allows a computer apparatus to perform a process for generating an image in which a contour line is drawn in a target object among a plurality of objects existing in a virtual three-dimensional space and is not drawn in a non-target object among the plurality of objects other than the target object and displaying the image in a display, the program allowing the computer apparatus to perform:

setting a viewing point of a virtual camera and a direction of a viewing axis in the virtual three-dimensional space to a predetermined position and a predetermined direction and storing virtual camera information on the viewing point and the direction of the viewing axis of the virtual camera in a storage included in the computer apparatus;

drawing a two-dimensional image acquired from perspectively transforming the plurality of objects based on the virtual camera information which is stored in the storage and writing the two-dimensional image in the storage;

detecting the contour of the target object included in the two-dimensional image storing contour information on the detected contour in the storage;

determining whether the target object is overlapped with the non-target object, the non-target object being located closer to the viewing point of the virtual camera than the target object in the two-dimensional image that is drawn and written in the storage;

drawing a contour line image of the contour line in the contour of the target information based on the contour information which is written in the storage and writing the contour line image of the contour line in the storage included in the computer apparatus; and generating the image composed of the two-dimensional image of the plurality of objects which is drawn and written in the storage and the contour line image of the contour line which is drawn and written in the storage and displaying the image in the display, wherein when the target object is determined to be overlapped with the non-target object, a first part of the contour line, which is determined to be overlapped by the non-target object, of the contour of the target object is not composed when generating the image, and wherein when the target object is determined to be overlapped with the non-target object, a second part of the contour line, that is different than the first part which is determined to be overlapped by the non-target object, of the contour of the target object is composed only when the second part is at least a predetermined length and the second part of the contour line of the contour of the target object is not composed when the second part is smaller than the predetermined length.

* * * * *